US012586032B2

(12) United States Patent
Kato et al.

(10) Patent No.: US 12,586,032 B2
(45) Date of Patent: Mar. 24, 2026

(54) ANALYSIS SYSTEM AND ANALYSIS METHOD USING SAME

(71) Applicant: HITACHI HIGH-TECH CORPORATION, Tokyo (JP)

(72) Inventors: Hirokazu Kato, Tokyo (JP); Motohiro Yamazaki, Tokyo (JP); Ryusuke Kimura, Tokyo (JP); Noriyuki Sumida, Tokyo (JP); Hiroyuki Tanai, Tokyo (JP); Asami Terakado, Tokyo (JP); Mitsuhiro Miyazaki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 47 days.

(21) Appl. No.: 18/719,304

(22) PCT Filed: Dec. 23, 2021

(86) PCT No.: PCT/JP2021/048032
§ 371 (c)(1),
(2) Date: Jun. 13, 2024

(87) PCT Pub. No.: WO2023/119597
PCT Pub. Date: Jun. 29, 2023

(65) Prior Publication Data
US 2025/0053920 A1      Feb. 13, 2025

(51) Int. Cl.
*G06Q 10/087*        (2023.01)
(52) U.S. Cl.
CPC .................................. *G06Q 10/087* (2013.01)
(58) Field of Classification Search
CPC ....... G06Q 10/087; G01N 2035/00673; G01N 2035/00752; G01N 2035/00811;
(Continued)

(56) References Cited

U.S. PATENT DOCUMENTS

| RE47,599 E | 9/2019 | Dearing et al. |
| 2009/0074618 A1 | 3/2009 | Mizumoto et al. |
| 2013/0244274 A1* | 9/2013 | Nishikawa ....... G01N 35/00663 |
| | | 435/39 |

FOREIGN PATENT DOCUMENTS

| JP | 2002-318511 | 10/2002 |
| JP | 2007315784 A | * 12/2007 |

(Continued)

OTHER PUBLICATIONS

Behl, Tapan et al. Bioinformatics Accelerates the Major Tetrad: A Real Boost for the Pharmaceutical Industry. International Journal of Molecular Sciences, 2021. (Year: 2021).*

(Continued)

*Primary Examiner* — Fawaad Haider
(74) *Attorney, Agent, or Firm* — MATTINGLY & MALUR, PC

(57)                ABSTRACT

An analysis system includes: an analyzer that performs an analysis using polymer filled in a polymer cartridge, acquires attribute information on the polymer cartridge, and transmits the attribute information to the outside; and a server that acquires the attribute information on the polymer cartridge transmitted from the analyzer, collates the attribute information with attribute information stored in a database, and transmits to the analyzer a determination result obtained by determining whether or not the polymer cartridge in which polymer corresponding to the collated attribute information has been filled already is proper as an object to be set on the analyzer.

8 Claims, 16 Drawing Sheets

(58) Field of Classification Search
CPC . G01N 2035/0091; G01N 2035/00881; G01N
35/00663; G01N 35/00732; G01N
35/00871; G01N 35/00
USPC ......................................................... 705/28
See application file for complete search history.

(56) References Cited

FOREIGN PATENT DOCUMENTS

| JP | 2009-068979 A | 4/2009 |
|----|---------------|--------|
| JP | 2013-195130 A | 9/2013 |

OTHER PUBLICATIONS

Written Opinion by IPEA received in corresponding International Application No. PCT/JP2021/048032 dated Jan. 17, 2023.
Written Opinion by IPEA received in corresponding International Application No. PCT/JP2021/048032 dated May 16, 2023.
International Preliminary Report on Patentability received in corresponding International Application No. PCT/JP2021/048032 dated Jul. 12, 2023.
International Search Report of PCT/JP2021/048032 dated Feb. 22, 2022.
Written Opinion of the International Searching Authority of PCT/JP2021/048032 dated Feb. 22, 2022.

* cited by examiner

FIG. 4C

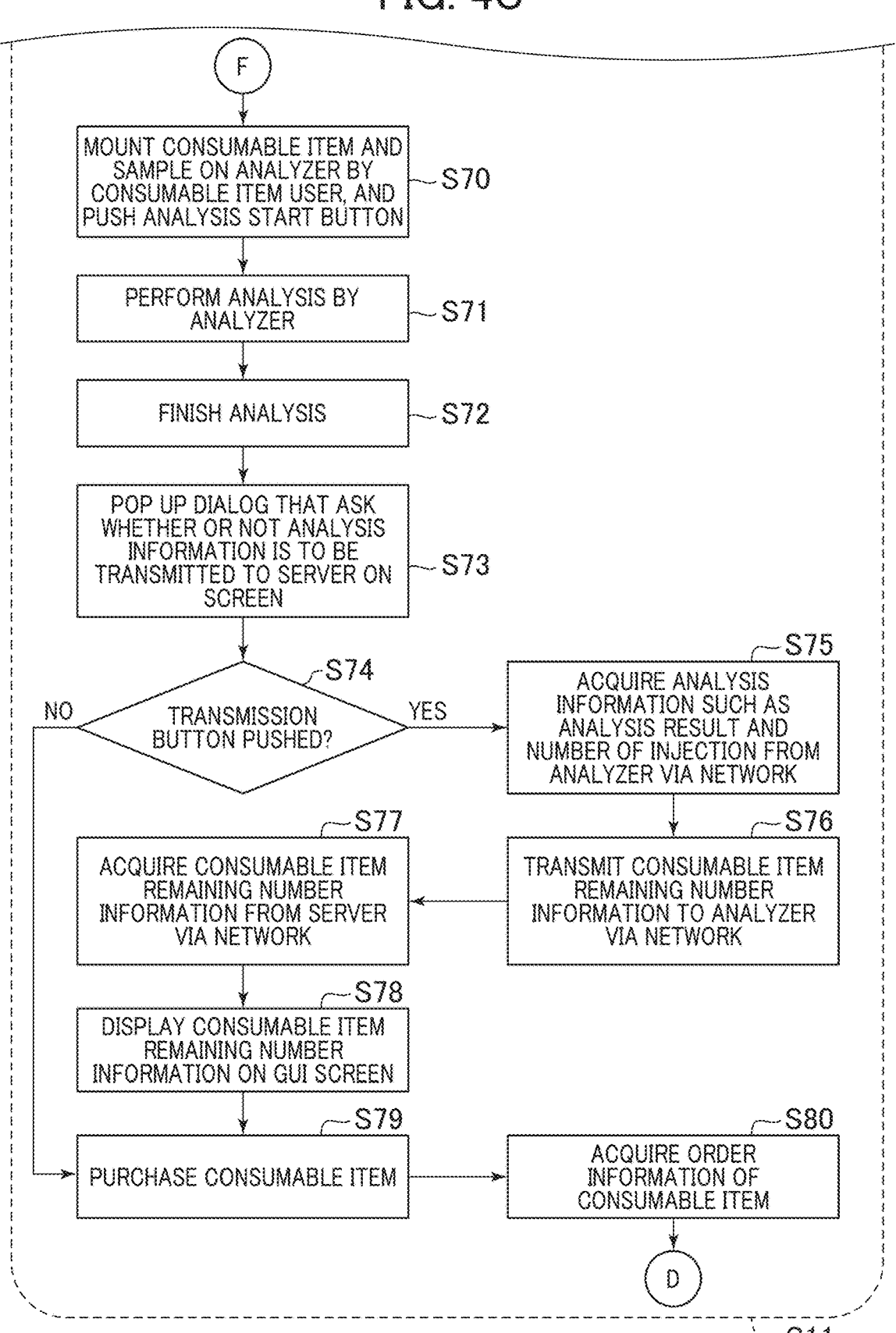

F

MOUNT CONSUMABLE ITEM AND SAMPLE ON ANALYZER BY CONSUMABLE ITEM USER, AND PUSH ANALYSIS START BUTTON — S70

PERFORM ANALYSIS BY ANALYZER — S71

FINISH ANALYSIS — S72

POP UP DIALOG THAT ASK WHETHER OR NOT ANALYSIS INFORMATION IS TO BE TRANSMITTED TO SERVER ON SCREEN — S73

S74 — TRANSMISSION BUTTON PUSHED?

NO

YES

ACQUIRE ANALYSIS INFORMATION SUCH AS ANALYSIS RESULT AND NUMBER OF INJECTION FROM ANALYZER VIA NETWORK — S75

TRANSMIT CONSUMABLE ITEM REMAINING NUMBER INFORMATION TO ANALYZER VIA NETWORK — S76

ACQUIRE CONSUMABLE ITEM REMAINING NUMBER INFORMATION FROM SERVER VIA NETWORK — S77

DISPLAY CONSUMABLE ITEM REMAINING NUMBER INFORMATION ON GUI SCREEN — S78

PURCHASE CONSUMABLE ITEM — S79

ACQUIRE ORDER INFORMATION OF CONSUMABLE ITEM — S80

D

S11

ANALYSIS SYSTEM AND ANALYSIS METHOD USING SAME

TECHNICAL FIELD

The present invention relates to an analysis system represented by an electrophoresis device that separates and analyzes a nucleic acid, protein and the like, and an analysis method using the analysis system.

BACKGROUND ART

Recently, along with the development of Internet, the term "Internet of Things" (IoT) has been popularly used. IoT indicates a system where various equipment and devices that have not been connected to Internet have become connected to a server or a cloud service via a network, and these equipment and devices perform an exchange of information among them. In such a system, the equipment and devices that are connected via networks are, for example, sensor equipment, drive devices (actuators), houses and buildings, vehicles, home appliances, electronic equipment and the like.

It is expected that, by connecting these equipment and devices with Internet, processing, conversion, analysis and coordination of information that have been hidden up to now can be performed on a computer (a server) that performs the centralized management of the information.

In general, in the field of analytical chemistry, a role that a reagent plays is important. To acquire a proper analytical result, it is necessary to prepare both a device that is properly calibrated, and a reagent in a proper state. In general, devices are fixed assets. Reagents are consumable items. Accordingly, it is necessary for a client who is a client of consumable products to periodically purchase the consumable items from a reagent manufacturer. However, the order of consumable products is not automated even at present where Internet prevails. Accordingly, it is necessary for a client to perform a manual operation relating to the order of reagents and hence, there exists a task to reduce such an operation.

To overcome such a task, in Patent Literature 1, a radio frequency identifier (hereinafter referred to as RFID) is added to a reagent that is a consumable item and is also a product. RFID means an overall technique that transacts information from RF tags from near-distance wireless communication using an electromagnetic field or a wireless tag in which ID information is embedded. In this specification, RFID indicates the latter wireless tag. In Patent Literature 1, a technique is described where a reagent use situation of a client is monitored based on information from the RFID (wireless tag), and these information are transmitted to a server of a reagent supplier via a network. Using these information, a client can perform the warehouse replenishment, an inventory list, tracking and reorder. Accordingly, an order operation of a client can be completely automated, or manual inputting becomes almost unnecessary.

In the same manner, there has been also known a technique where unique labels are attached to containers for respective chemical substances. There has been known a technique where a shipping history and a use history of the chemical substances are stored via a network such as Internet with the use of these labels.

Recently, the importance of health care is called for so that a human lifespan is extended, and the era of 100-year lifespan has been sought. A rate of population over sixties with respect to the total population is steadily increased from now on, and all advanced countries are entering the ultraaging society. Under such a circumstance, a genomic medicine has been attracting an attention. The genomic medicine is a medical discipline where genomic information on an individual patient is applied to a diagnosis, and a medical care that is suitable for the individual patient is applied to the patient. As a device for reading gene sequence information, a deoxyribonucleic acid (DNA) sequencer is used. That is, the DNA sequencer is one of typical analyzers.

A human genome project that aims at an analysis of complete base sequence of human genomes was completed in 2003. The technique relating to the decision of the base sequence (sequence) has made a great progress from the day of the completion the analysis of all base sequence of human genomes by today, and various techniques have been proposed. However, a classical DNA reading method referred to as the Sanger method that was adopted in the human genome project is an indispensable technique in genetic analysis because of its high accuracy in reading bases and its priority in terms of an analysis cost per one sample. A DNA sequencer that uses this Sanger method is referred to as a capillary sequencer.

In the capillary sequencer that uses the Sanger method, a capillary tube that is referred to as a capillary is filled with a polymer that is a separation medium. This polymer exhibits a molecular sieve effect, and plays a role of developing various DNA that are filled in a proximal end of the capillary and have different base lengths depending on molecular weights. Further, among reagents that are used in the capillary sequencer, polymer is most expensive and hence, a reagent manufacturer manages a manufacturing method of its own as a knowhow. Accordingly, the specific compositions and the specific manufacturing methods of the polymer are not disclosed.

At present, polymer is sold to a client in a mode where the polymer is preliminarily filled in a predetermined container. A label such as RFID is attached to the polymer container. Most of sequencer devices that are sold in markets now adopt a mode where an analysis is performed by directly mounting a polymer container on the sequencer device.

At present, Thermo Fisher Scientific Inc. has a large share in the field of a capillary sequencer. One of characteristics of capillary sequencers that the company sells is a part referred to as a polymer block. The polymer block is a part that becomes an interface between a polymer container and a sequencer device at the time of exchanging a polymer. An expiration date of a polymer mounted on the sequencer device is two weeks. Accordingly, a client has to mount a new polymer container on the sequencer device and to perform an analysis every two weeks. In this case, there arises a problem with respect to a consumption amount of polymer that occurs along with an exchange of a polymer container. That is, although such a problem is irrelevant to the analysis itself, a large amount of polymer becomes necessary for cleaning a flow passage in the polymer block and the removal of bubbles in the flow passage that are preparations to be performed before performing the analysis.

For example, in a case where the analysis is performed using a capillary having an inner diameter of 50 $\mu$m and a total length of 47 cm, as expressed in an expression (1), approximately 500[$\mu$L] of polymer becomes necessary when 96 samples are prepared.

[Formula 1]

$$(0.005 \text{ mm})^2 \times \pi \times 470 \text{ mm} \times 96 \times 1.5 = 531 \text{ } [\mu L] \qquad (1)$$

wherein, the first term indicates an inner diameter, the second term indicates a circle ratio, the third term is a total length, the fourth term is the number of samples, and the fifth term is a tolerance.

On the other hand, it is estimated that a capacity of polymer in the polymer container is approximately 5 [mL]. Accordingly, it can be estimated that polymer necessary for an analysis is approximately $\frac{1}{10}$ of polymer that a client actually purchases. In other words, it is safe to say that polymer that is not directly relevant to the analysis is consumed by an amount of 90% for the maintenance. This attributes to a situation where the sequencer of Thermo Fisher Scientific Inc. adopts a part referred to as the polymer block. Accordingly, in a case where a client uses the sequencer manufactured by Thermo Fisher Scientific Inc., the consumption of a large amount of polymer is unavoidable.

CITATION LIST

Patent Literature

[Patent Literature 1]
U.S. Reissue Pat. No. 47599 specification

SUMMARY OF INVENTION

Technical Problem

Polymer that is an electrophoretic medium in a conventional sequence is sold in a mode where the polymer is preliminarily filled in a predetermined container. On the other hand, polymer requires a highest running cost among sequence reagents on an electrophoresis base. Accordingly, a client of the sequencer on a capillary electrophoresis base has a strong desire to reduce a running cost by reducing a consumption amount of the electrophoresis polymer.

In view of the above, it is considered to provide a capillary sequencer that does not include a polymer block as a part and is used as a consumable item.

Thermo Fisher Scientific inc. sells polymer that is a separate medium also in the form of a bottle shape without limiting polymer to the shape of a consumable item that is directly mounted on an analyzer. Further, besides Thermo Fisher Scientific inc., Molecular Cloning Laboratories (MCLAB), NimaGen B.V, Agilent Tchnologies Inc. and the like also sell their unique polymers.

By adopting a mode where polymer is used in an analysis by filling polymer that is sold in a bottle shape into a polymer cartridge that is a consumable item, a client can save a large amount of polymer that is wasted for maintenance of a polymer block. As a result, the client can largely reduce a running cost of an analysis by reducing a consumption amount of electrophoresis polymer.

With the use of the capillary sequencer that does not include the polymer block as a part and is used as a consumable item, the capillary sequencer also has an advantageous effect that flow passage cleaning and a bubble removing operation that are maintenance operations accompanying an exchanging operation of polymer become unnecessary.

However, in the capillary sequencer that uses the polymer block as a consumable item, it is considered that an empty container for polymer is offered through an informal route. In a case where the empty bottle does not satisfy the required specification of the analysis, there is a possibility that the accuracy that the analysis expects cannot be acquired. Further, there is also a possibility that a client reuses the empty container. In this case, there is a concern that mixing (contamination) of a foreign DNA occurs. In the same manner, there is a concern that the required specification for the analysis is not satisfied.

In view of the above-mentioned circumstances, it is an object of the present invention to issue a warning in a case where an analysis is in a mode that does not satisfy the required specification for the analysis.

Solution to Problem

To solve the above-described problem, an analysis system according to the present invention includes: an analyzer having: a transmission device that is configured to acquire attribute information that includes lot information of a reagent filling container and to transmit the attribute information of the reagent filling container to an outside, and a display; a database that stores attribute information that includes lot information of a reagent filling container shipped to a market; and a server that is configured to acquire the attribute information on the reagent filling container transmitted from the transmission device, to collate the attribute information on the reagent filling container transmitted from the transmission device with the attribute information on the reagent filling container stored in the database, to determine whether or not the reagent filling container that corresponds to the collated attribute information is proper as an object to be set on the analyzer, and to transmit a determination result to the analyzer. The analyzer is configured to acquire the determination result from the server, and to make the display display the determination result.

An analysis method according to the present invention includes the steps of: allowing a transmission device that is a part of an analyzer that includes a display to acquire attribute information including lot information of a reagent filling container and transmit the attribute information to a server; allowing the server to acquire the attribute information on the reagent filling container transmitted from the transmission device, and to collate the attribute information with attribute information that is stored in database and includes lot information on the reagent filling container shipped to a market; allowing the server to determine whether or not the reagent filling container in which a reagent has been already filled that corresponds to the collated attribute information is proper as an object to be set on the analyzer and to transmit a determination result to the analyzer; and allowing the analyzer to acquire the determination result from the server and to display the determination result on the display.

The other means will be described in Description of Embodiments.

Advantageous Effects of Invention

According to an aspect of the present invention, it is possible to issue a warning in a case where an analysis is in a mode that does not satisfy the required specification for the analysis.

BRIEF DESCRIPTION OF DRAWINGS

FIG. 4C is a flowchart of analysis preparation processing according to the second embodiment.

DESCRIPTION OF EMBODIMENTS

Figure 1:
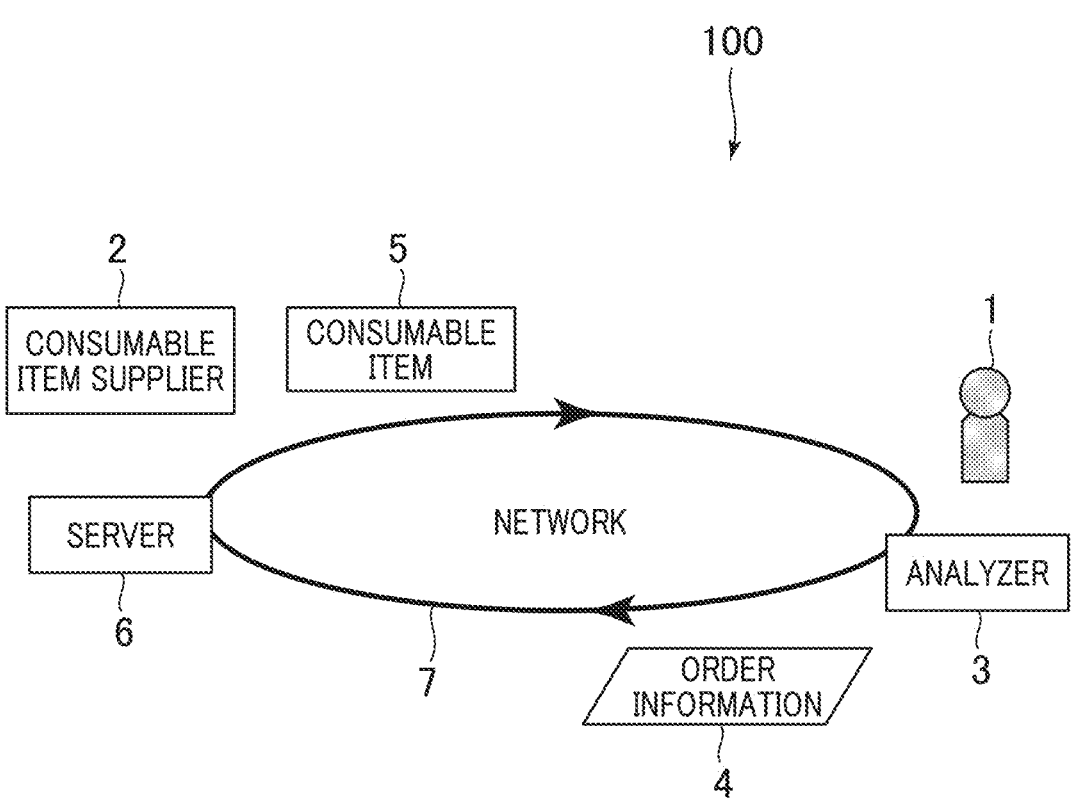
FIG. 1 is a constitutional view of an analysis system according to the present embodiment.

Hereinafter, a mode for carrying out the present invention will be described with reference to the respective views.

An analysis system 100 that realizes the present invention is illustrated with reference to FIG. 1.

The analysis system 100 is configured such that a server 6 managed by a consumable item supplier 2 and an analyzer 3 used by a consumable item user 1 uses are connected to each other via a network 7 such as Internet. The server 6 of the consumable item supplier 2 and the analyzer 3 of the consumable item user 1 transmit information between them via the network 7.

The analyzer 3 is a capillary electrophoresis device having the configuration where, using a consumable item 5 set on the analyzer 3, a sample performs electrophoresis, the sample being charged into a capillary filled with polymer that functions as a separation medium.

The consumable item 5 is a part that is supplied from the consumable item supplier 2 to the consumable item user 1, and is a part for assembling a polymer filling container that is configured such that polymer received from a polymer supplier not illustrated in the drawing is filled in the polymer filling container by the consumable item user 1.

The consumable item 5 is a consumable item that is used at the time of performing an analysis by the analyzer 3. The consumable item 5 is transmitted from the consumable item supplier 2 to the consumable item user 1 by means of a physical means such as a courier service based on order information 4 from the consumable item user 1. The consumable item user 1 mounts the consumable item 5 supplied from the consumable item supplier 2 in the analyzer 3 and performs an analysis. In this embodiment, the analyzer 3 is not installed in the vicinity of the consumable item supplier 2. The consumable item user 1 possesses the analyzer 3. For example, the analyzer 3 is installed in a facility where the consumable item user 1 performs the analysis.

Analysis information that is acquired from the analyzer 3 is transmitted from the analyzer 3 to the server 6 via an external network 7. Accordingly, the analysis information is shared by the consumable item supplier 2 and the consumable item user 1. In the same manner, information relating to the consumable item 5 used by the consumable item user 1 is also transmitted from the analyzer 3 to the server 6 via the external network 7. Accordingly, the information relating to the consumable item 5 is also shared by the consumable item user 1 and the consumable item supplier 2. As a result, the consumable item supplier 2 can grasp the data on the consumable item 5 used by the consumable item user 1, and can manage the data.

The server 6 that belongs to the consumable item supplier 2 collates at least either one of information relating to polymer or attribute information on a consumable item with information stored in a database, and determines whether or not the polymer or the consumable item that corresponds to the transmitted information is proper as an object to be set on the analyzer 3. Further, the consumable item supplier 2 can grasp the state of the consumable item 5 preserved by the consumable item user 1 and can perform the inventory management real time over online.

In a case where the consumable item user 1 faces a shortage of consumable items 5, the consumable item user 1 can transmit delivery request information to the consumable item supplier 2 via the network 7. The inventory management can be performed over online and hence, even when the consumable item user 1 does not pay attention to an inventory state of the consumable items 5, the server 6 owned by the consumable item supplier 2 can estimate a shortage of the consumable items 5 or a possible shortage of the consumable items 5. The server 6 transmits information on the shortage estimated consumable items 5 to the analyzer 3 via the network 7. For example, the attraction of attention is displayed on a GUI screen of the analyzer 3 so as to prompt the consumable item user 1 to order the consumable items 5. The GUI screen of the analyzer 3 is transferable to the order screen for the consumable items 5. The consumable item user 1 can perform an order operation by only performing a manipulation on a terminal of the analyzer 3 and hence, the consumable item user 1 can reduce various operations accompanying an ordering operation. Alternatively, in a case where the consumable item user 1 desires the automatic replenishment of the consumable items 5, a mode is considered where the analyzer 3 automatically performs an ordering operation.

The purpose of the consumable item user 1 is the reduction of cost for performing an experiment. Polymer is a particularly expensive reagent among reagents for analysis used by a capillary sequencer. The consumable item user 1 is considering the reduction of a running cost of polymer. Accordingly, the consumable item user 1 assembles an empty container by using parts of reagent cartridges included in the consumable items 5, and dispenses polymer purchased from a reagent manufacturer into the vacant container.

On the other hand, the purpose of the consumable item supplier 2 is the securing of a profit by expanding the sale of the consumable items 5, and the guarantee of analysis accuracy by the analyzer 3. This can be realized by issuing warning to the use of the consumable item 5 in a mode where the specification of the analysis is not satisfied. What the consumable item supplier 2 should perform to achieve such a purpose is the followings.

(1) The consumable item supplier 2 preliminarily provides the consumable item user 1 with the attribute information unique to the consumable item 5.

(2) The consumable item user 1 provides the consumable item supplier 2 with the attribute information on the consumable item 5 and information on polymer that is dispensed to a cartridge that is the consumable item 5 at the time of performing an analysis. The server 6 of the consumable item supplier 2 collates this information via the network 7.

(3) In a case where the consumable item supplier 2 has confirmed the collation via the server 6, the consumable item supplier 2 notifies the consumable item user 1 of this confirmation of the collation. For example, the consumable item supplier 2 confirms, for example, that the consumable item 5 is a genuine product manufactured by the consumable item supplier 2, that the cartridge of the consumable item 5 is not reused, that the polymer is an operation guaranteed product, that a usable period of the polymer is not expired, and the like.

(4) In a case where the consumable item 5 is not a genuine product, in a case where the cartridge of the consumable item 5 is reused, in a case where the polymer is not an operation guaranteed product, or in a case where an expiration date has passed, the consumable item supplier 2 transmits warning information to the consumable item user 1 via the server 6. With such operations, the consumable item user 1 can know that there is a possibility that the cartridge of the consumable item 5 is not suitable for an analysis.

First Embodiment

An analysis system according to the first embodiment reads information on an empty polymer filling container and information on polymer that are supplied to a client, and transmits the information to the consumable item supplier of the polymer filling container via Internet at the time of performing device reading immediately before the analysis. The consumable item supplier collates the information on the polymer filling container with sale information, and transmits a result of determination whether or not the polymer filling container is proper to the analyzer of the client. Accordingly, it is possible to issue warning to the reuse of the filling container and the use of the filling container whose operation is not guaranteed.

Figure 2:
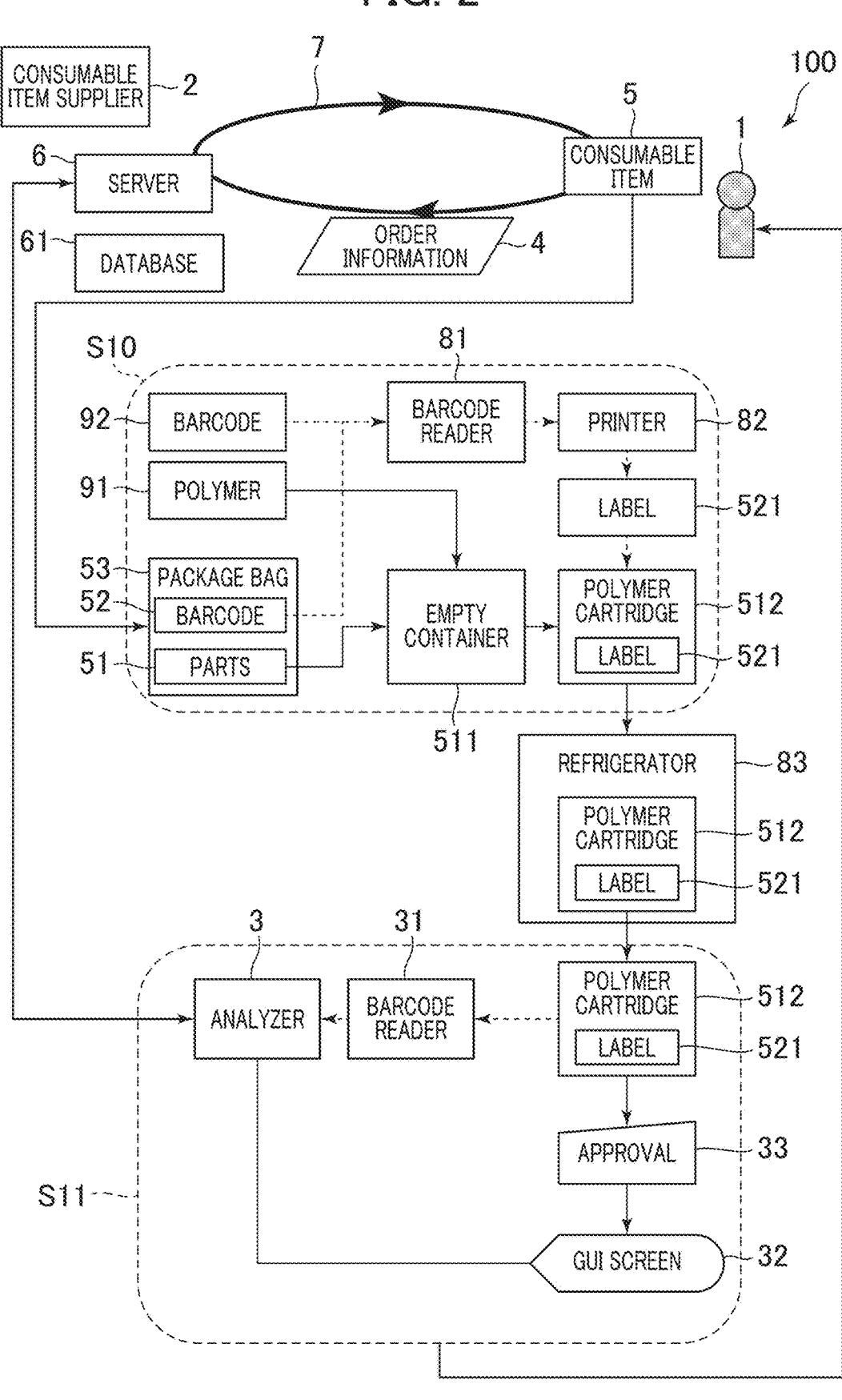
FIG. 2 is a view illustrating the configuration and an operation of the analysis system according to the first embodiment.

FIG. 2 is a view illustrating the configuration of the manner of operation of the analysis system 100 according to the first embodiment.

In the first embodiment, to perform an analysis that specifically uses capillary electrophoresis, the consumable item user 1 assembles parts 51 of the consumable item 5 to form an empty container 511. Then, the consumable item user 1 dispenses polymer 91 as an electrophoresis medium that is manufactured and is sold from other reagent manufacturer and adheres a label thus preparing a polymer cartridge 512. This polymer cartridge 512 is a reagent filling container in which the polymer 91 is already filled. Then, the consumable item user 1 performs an analysis test using the polymer cartridge 512, and shares a use state, an analysis condition and a result of the analysis of the consumable item 5 with the consumable item supplier 2 via the network 7.

Although the polymer 91 that is an electrophoresis medium is a medium for separating a biopolymer, there are various applications in which the polymer 91 can be used. To be more specific, a DNA sequence analysis, and an application in which a DNA fragment analysis is performed are named. A single-stranded DNA is treated in these applications and hence, in general, it is necessary to arrange two-stranded DNA whereby the polymer 91 contains urea or the like at high concentration. Accordingly, the separation is performed using polymer referred to as modified polymer. Further, in a case where it is desirable to measure a molecule weight in a state of two-stranded DNA without arranging one-stranded DNA, in general, the separation is performed using polymer referred to as non-modified polymer in general. Further, polymer that performs bonding and dissociation between protein and a nucleic acid is commercially available.

Sizing of DNA covers a wide range, wherein a short DNA molecule is approximately 100 bp (Base Pair), and a long DNA molecule has a length of 10 kbp or more. Accordingly, various polymers are commercially available under the current situation.

The analysis system 100 according to the first embodiment includes, in addition to the server 6 and the analyzer 3 illustrated in FIG. 1, a database 61, a barcode reader 81, and a printer 82. A barcode reader 31 is connected to the analyzer 3, and a GUI screen 32 is displayed on a touch panel display not illustrated in the drawing. The analyzer 3 performs an analysis using the polymer 91 filled in a polymer cartridge 512 that is a reagent filling container. The analyzer 3 also functions as a transmission device that acquires attribute information on the polymer cartridge 512, and transmits the attribute information to the server 6.

The server 6 is a computer that performs a centralized management of the information on consumable item 5 on the database 61 by being connected with the analyzer 3 via the network 7. The server 6 collates the attribute information on the polymer cartridge 512 transmitted from the analyzer 3 with the attribute information stored in the database 61, and determines whether or not the polymer cartridge 512 that corresponds to the collated attribute information is proper as an object to be set on the analyzer 3.

The database 61 is provided for allowing the server 6 to manage the consumable item 5, the polymer 91, and the like shipped to a market. The database 61 stores the attribute information on the consumable item 5 shipped to the market, information on the polymer 91, and the like.

The barcode reader 81 reads a two-dimensional barcode and decodes the read two-dimensional barcode, and is connected to a printer 82. The barcode reader 81 is a first reader that reads the information relating to the polymer 91 that is a reagent and the attribute information on the polymer cartridge 512 that is a reagent filling container in a mutually independent manner.

The printer 82 is connected to the barcode reader 81, and prints predetermined information on a label. For example, the printer 82 prints a two-dimensional barcode as the label. The label is a data label that is outputted based on information read by the barcode reader 81, for example.

The barcode reader 31 reads a two-dimensional barcode, and decodes the read two-dimensional barcode, and is connected to the analyzer 3. The barcode reader 31 is configured to read a data label in which information where information relating to the polymer 91 and the attribute information on the polymer cartridge 512 are integrated with each other is encoded.

The barcode reader 31 is not limited to such a configuration. That is, the barcode reader 31 may be a second reader or a transmission device that is operated as a single unit, and is configured to read a data label in which information where information relating to the polymer 91 and the attribute information on the polymer cartridge 512 are integrated with each other is encoded, and is communicably connected with the server 6. That is, the configuration of the barcode reader 31 is not limited. Further, the first reader and the second reader may be the same reader. This same reader may be connected to the analyzer 3, or may form a part of the analyzer 3.

To facilitate the understanding of this step, this step is described hereinafter by dividing the step into a preparation step S10 of preparing the polymer cartridge 512 from the empty container 511, and an analysis step S11 that uses the analyzer 3.

<Preparation Step S10 of Polymer Cartridge 512>

First, the preparation step S10 of the polymer cartridge 512 from the empty container 511 is described. A package bag 53 to which the two-dimensional barcode label 52 adheres is stored in the consumable item 5. Ten sets of parts 51 each consisting of a syringe, a seal, a rubber plug, a cap, and the like are stored in the package bag 53. Information on a lot number, a manufacturing year/month/date, an expiration date, the number of supplied respective constitutional parts, and the like of the parts 51 that form the polymer cartridge 512 are described on the two-dimensional barcode label 52.

The consumable item user 1 assembles the empty container 511 of the polymer cartridge from these parts 51. The consumable item user 1 fills the polymer 91 that is an electrophoresis medium and is sold from a reagent manufacturer into the empty container 511, and seals the empty container 511 with a cap thus assembling the polymer cartridge 512.

On the other hand, in such a state, with respect to the polymer cartridge 512, the attribute information on the polymer cartridge 512 and the information on the polymer 91 that is a reagent sealed in the polymer cartridge 512 are not linked with each other. The attribute information on the polymer cartridge 512 is information such as a lot number, supplied number relating to the parts 51, and is encoded in the two-dimensional barcode label 52. The information on the polymer 91 that is a reagent is information on a manufacturer, a kind, a manufacturing year/month/data, an expiration date, a lot number, a serial number, and the like, and is encoded in the two-dimensional barcode label 92.

To link these information with each other, the consumable item user 1 prepares a new two-dimensional barcode label 521, and adheres the new two-dimensional barcode label 521 to the polymer cartridge 512. The attribute information (constitutional part information) of the polymer cartridge 512 is recorded in the two-dimensional barcode label 52 adhering to the package bag 53. On the other hand, the information on the polymer 91 that is a reagent is recorded in the two-dimensional barcode label 92.

The barcode reader 81 reads the two-dimensional barcode label 52 and decodes the attribute information, and adds identification number information that identifies ten polymer cartridges 512 from each other in the attribute information on the polymer cartridge 512. Then, the barcode reader 81 reads the two-dimensional barcode label 92 and decodes information on the polymer 91, and integrates the decoded data with the attribute information on the polymer cartridge 512. With such steps, information corresponding to ten polymer cartridges 512 that are prepared from ten sets of parts is generated.

The printer 82 encodes information that the barcode reader 81 generates, and prints the encoded information as ten pieces of two-dimensional barcode labels 521. Print applications installed in the printer 82 correspond to various commercially available polymers and hence, information corresponding to the respective polymers and the attribute information (information on constitutional parts) of the polymer cartridge 512 can be integrated with each other. That is, by adhering these ten pieces of two-dimensional barcode labels 521 to a side surfaces of the polymer cartridge 512 in which the polymer 91 is filled, it is possible to link information physically necessary for the polymer cartridge 512 with each other. Although it depends on a plan of an experiment performed by the consumable item user 1, usually, the consumable item user 1 preserves the prepared polymer cartridge 512 in a refrigerator 83 at a temperature of 4[° C.].

<Analysis Step S11 that Uses Analyzer 3>

Next, the analysis step S11 where the analysis is performed using the polymer cartridge 512 filled with the polymer 91 is described.

The consumable item user 1 takes out the polymer cartridge 512 preserved at a temperature of 4[° C.] from the refrigerator 83 and leaves the polymer cartridge 512 in a room for approximately one hour for returning the temperature of the polymer cartridge 512 to a room temperature. After the temperature of the polymer in the polymer cartridge 512 sufficiently reaches an equilibrium state with a room temperature, the consumable item user 1 reads the two-dimensional barcode label 521 adhering to the polymer cartridge 512 using the barcode reader 31. A guidance for a series of these manipulations is displayed on the GUI screen 32 displayed on the touch panel of the analyzer 3.

The information read by the barcode reader 31 is recorded in the analyzer 3 and, thereafter, is transmitted to the server 6 of the consumable item supplier 2 via the network 7. The server 6 determines whether or not the polymer cartridge 512 relating to this information is proper for an analysis based on the transmitted information, and gives a result of determination to the analyzer 3 via the network 7. The analyzer 3 displays the following information as the GUI screen 32. That is, the analyzer 3 displays the entirety or a portion of the information where the kind of the read polymer, the lot number, the serial number, and the expiration date, the lot number of the parts constituting the polymer cartridge 512, the expiration date, the number of parts packaged in the package bag 53, the number of parts consumed by now, the identification information on the respective polymer cartridges 512, and the like are integrated with each other. At the same time, the analyzer 3 displays whether or not the polymer cartridge 512 is proper for an analysis on the GUI screen 32. The consumable item user 1 performs the analysis described hereinafter after the consumable item user 1 checks the GUI screen 32.

The specific analysis may be a sequence analysis using a capillary electrophoresis device, a fragment analysis, or a quality control (QC) of a library of a next generation sequencer. Alternatively, the specific analysis may be the detection of cell free DNA, the detection of cancer tumor DNA, the detection of interaction between protein and DNA, the detection of aptamer, or a detection method of an interaction between protein and protein.

In the first embodiment, as an example where the consumable item user 1 dispenses a reagent into the empty container 511 by himself/herself, a case where polymer is used has been described. However, a reagent that can be used in the first embodiment is not limited to polymer. To be more specific, as a reagent that can be used in the first embodiment, for example, in a capillary sequencer, also with respect to an anode buffer, a cathode buffer or the like, the consumable item user 1 can dispense such a buffer purchased from a different reagent manufacturer into the empty container.

Figure 3A:
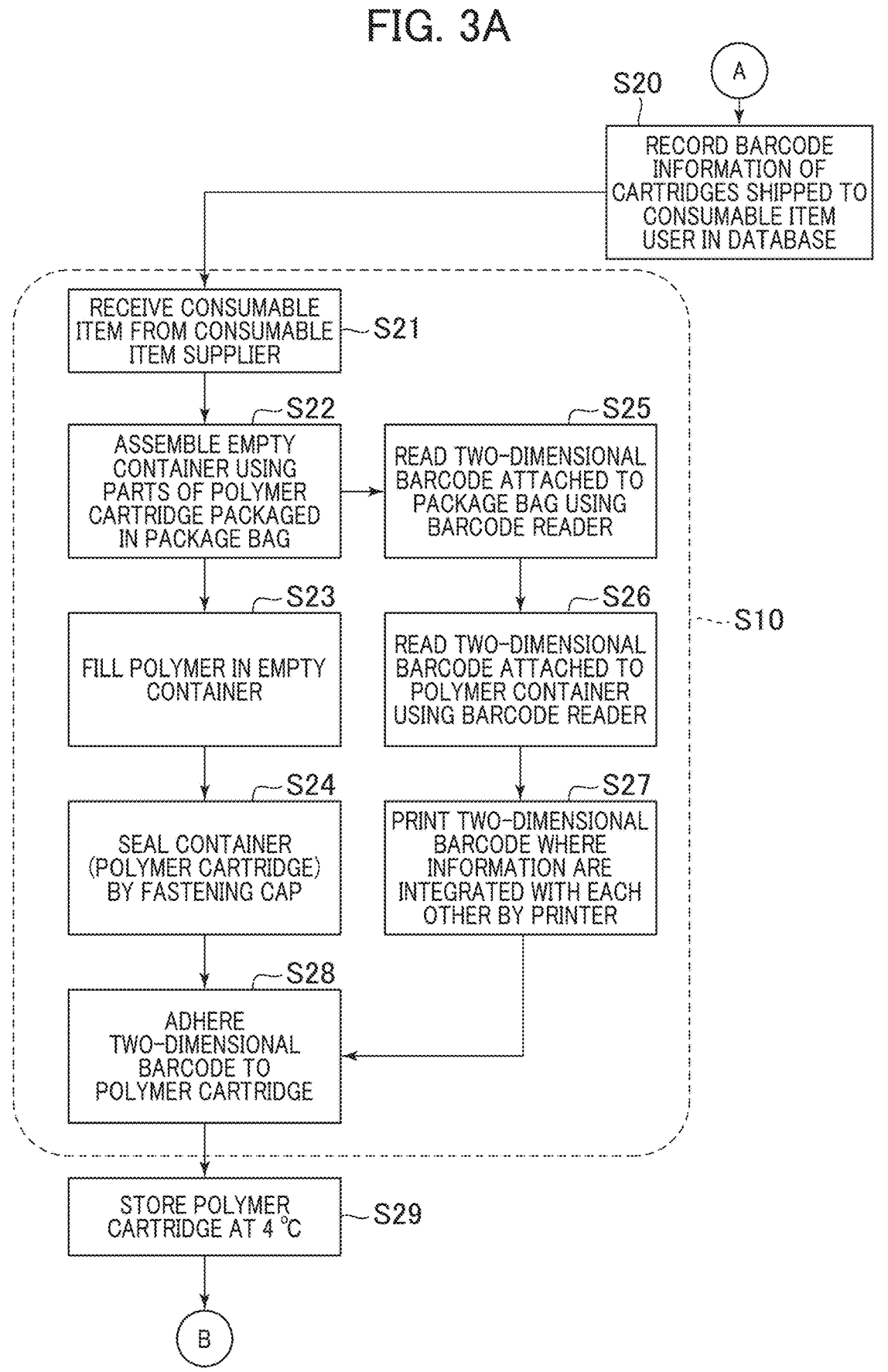
FIG. 3A is a flowchart of analysis preparation processing according to the first embodiment.
Figure 3B:
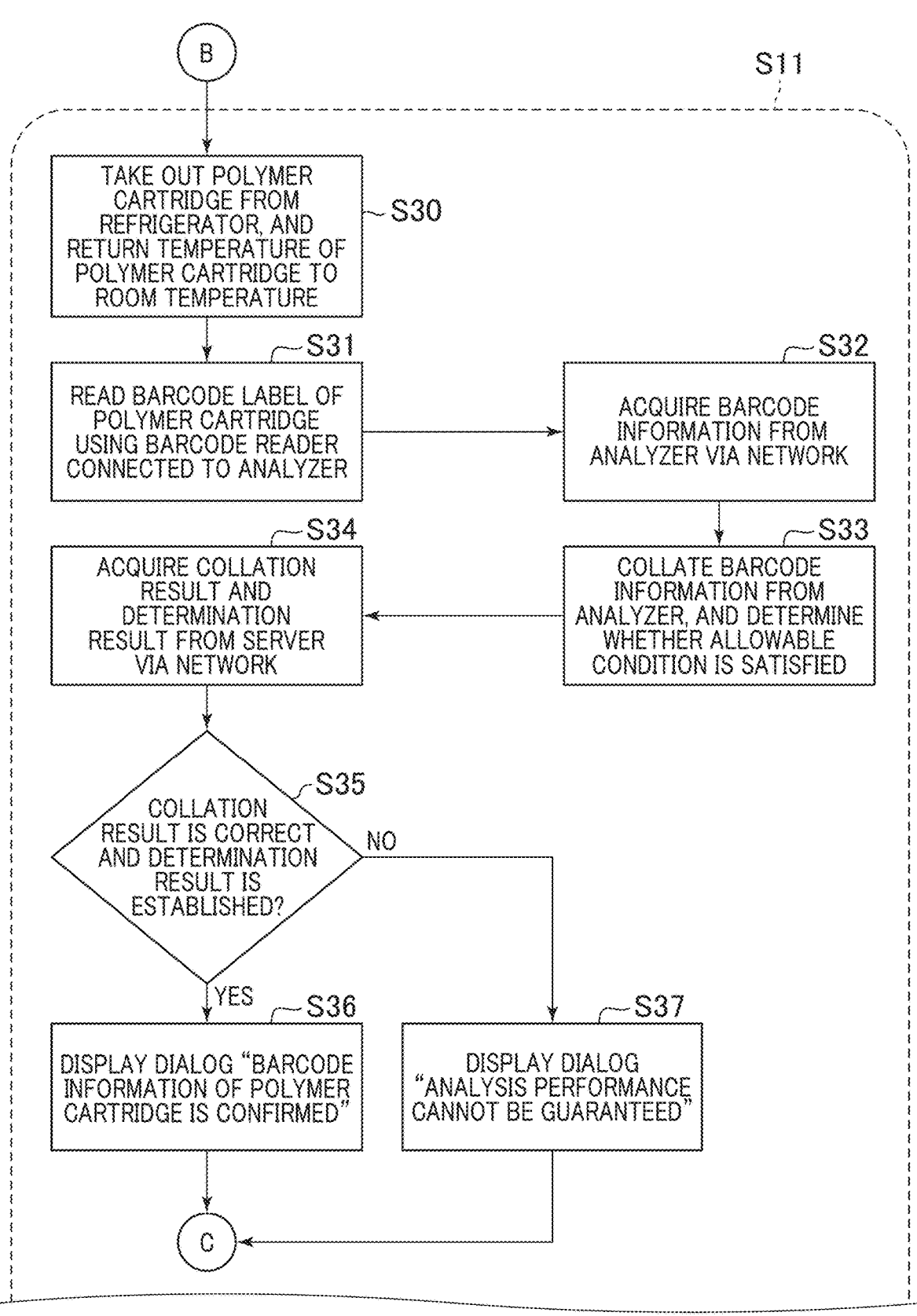
FIG. 3B is a flowchart of analysis preparation processing according to the first embodiment.
Figure 3C:
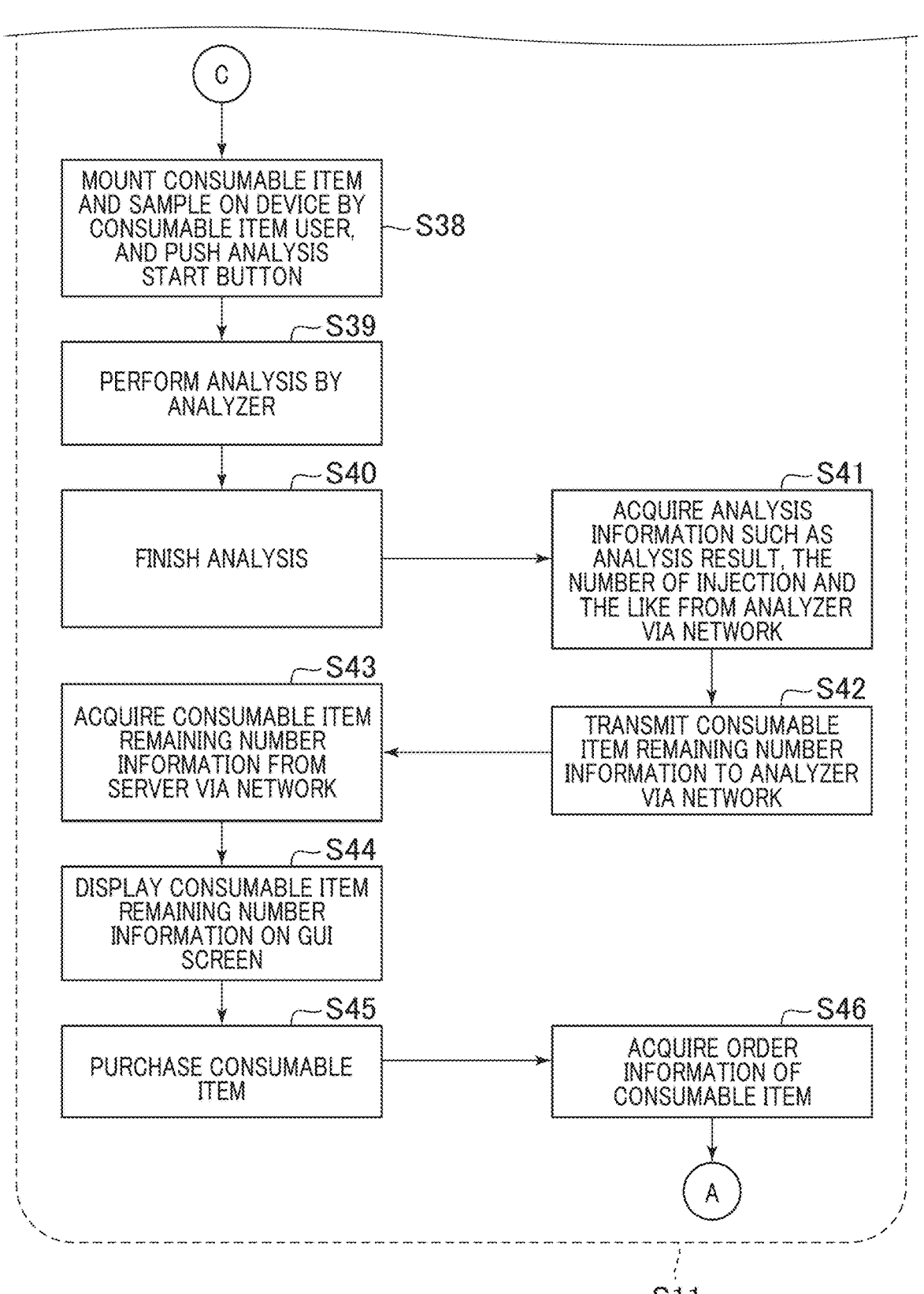
FIG. 3C is a flowchart of analysis preparation processing according to the first embodiment.

FIG. 3A to FIG. 3C illustrate a flowchart of analysis preparation processing according to the first embodiment, and the analysis preparation processing is described also with reference to FIG. 2 when necessary.

The specific operations are performed by two operators, that is, the consumable item user 1 and the consumable item supplier 2. Further, the step is roughly divided into two steps. One step is a preparation step S10 of preparing the polymer cartridge 512, and an analysis step S11 of performing an analysis using the polymer cartridge 512.

First, a pre step of the preparation step S10 of the polymer cartridge 512 is described. In purchasing of the consumable item 5 by the consumable item user 1, the consumable item supplier 2 transmits the consumable item 5 to the consumable item user 1, and the server 6 records the barcode information on the cartridge transmitted to the consumable item user 1 in the database 61 (step S20). Accordingly, it is possible to collate lot information on the consumable item 5 that is a polymer filling container with lot information on the polymer filling container transmitted from the analyzer 3 owned by the consumable item user 1. When the processing in step S20 is finished, the processing advances to the preparation step S10 of the polymer cartridge 512.

The preparation step S10 of the polymer cartridge 512 is a step where the consumable item user 1 assembles the parts 51 of the polymer cartridge 512 supplied from consumable item supplier 2 by himself/herself, and fills the polymer 91 that is commercially available in a various-kind market by himself/herself thus preparing the polymer cartridge 512.

In the preparation step S10 of the polymer cartridge 512, the consumable item user 1 receives the consumable item 5 from the consumable item supplier 2 (step S21). The consumable item user 1 assembles the empty container 511 using the parts 51 of the polymer cartridge 512 packaged in the package bag 53 (step S22). Then, the consumable item user 1 fills the polymer 91 in the empty container 511 (step S23). Next, the consumable item user 1 attaches a cap to the empty container 511 and fastens the cap thus sealing the polymer 91 (step S24).

In parallel with the operations performed from step S22 to step S24, the consumable item user 1 reads the two-dimensional barcode label 52 attached to the package bag 53 of the parts 51 of the polymer cartridge 512 using the barcode reader 81 (step S25). Then, the consumable item user 1 reads the two-dimensional barcode label 92 attached to the container of the polymer 91 using the barcode reader 81 (step S26). Then, the consumable item user 1 prints the two-dimensional barcode label 521 that is formed by integrating the information (attribute information) of the parts 51 of the polymer cartridge 512 and the reagent information on the polymer 91 using the printer 82 (step S27).

The consumable item user 1 adheres this printed two-dimensional barcode label 521 to the polymer cartridge 512 (step S29). With such an operation, the attribute information such as lot numbers and the number of supplied parts relating to the parts 51 that constitute the polymer cartridge

512, and information such as a manufacturer, a kind, a manufactured year/month/day, an expiration date, a lot number, a serial number of the polymer 91 that is a reagent sealed in the polymer cartridge 512 are integrated with each other and are brought into a linked state. To be more specific, a situation is brought about where the reagent is disposed on the device immediately before an analysis, when the consumable item user 1 reads the two-dimensional barcode label 521 adhered to the polymer cartridge 512 to be used in the analysis, it is possible to prevent misunderstanding between a thing and information on the thing. These processing from step S21 to step S28 are included in the preparation step S10.

In general, once the polymer cartridge 512 is prepared, the polymer cartridge 512 is preserved in the refrigerator 83 at a temperature of 4° C. (step S29). However, it is not always the case that this low temperature preservation is indispensable, and the processing may advance to the analysis step S11 directly without being subjected to the preservation.

Next, the analysis step S11 that is performed using the polymer cartridge 512 is described. The consumable item user 1 takes out the polymer cartridge 512 from the refrigerator 83, and returns the temperature of the polymer cartridge 512 to a room temperature (step S30). Then, the consumable item user 1 reads the two-dimensional barcode label 521 of the polymer cartridge 512 by the barcode reader 31 connected to the analyzer 3 (step S31). This information is transmitted from the analyzer 3 to the server 6 via the network 7. That is, the server 6 acquires the barcode information on the polymer cartridge 512 that the consumable item user 1 is going to use (step S32). This information also includes analysis start date information.

The server 6 of the consumable item supplier 2 performs a collation operation between the attribute information relating to parts 51 of the polymer cartridge 512 and the barcode information on the consumable item 5 shipped to a market and the like based on the barcode information from the analyzer 3 (step S33). In this collation operation, the server 6 collates whether or not the polymer cartridge 512 that corresponds to the barcode information is a product genuinely shipped, and also collates whether or not the polymer cartridge 512 is reused based on the identification information included in the barcode information. In a case where the polymer cartridge 512 is a product genuinely shipped and also is not reused, the server 6 determines that the collation result is correct.

In the step S33, the server 6 further determines whether or not an allowable condition that the polymer 91 can withstand the analysis based on information such as a manufacturer that manufactured the polymer 91 filled in the polymer cartridge 512, the lot number, the serial number, and the expiration date. To be more specific, the server 6 determines whether the polymer 91 can withstand the analysis by collating the analysis start date and the expiration date of the polymer with each other.

The analyzer 3 acquires the collation result and the determination result of the analysis allowable condition from the server 6 via the network 7 (step S34). Then, the analyzer 3 determines whether or not this collation result is correct, and also whether or not the polymer 91 satisfies the analysis allowable condition (step S35).

In the step S35, in a case where the collation result of the barcode information is correct and the polymer 91 satisfies the analysis allowable condition (Yes), the analyzer 3 displays a dialogue "The barcode information on the polymer cartridge is confirmed." on the GUI screen 32 (step S36).

In the step S35, in a case where either the collation result of the barcode information is not correct or the polymer 91 does not satisfy the analysis allowable condition (No), the analyzer 3 displays a dialogue "The analysis performance cannot be guaranteed." on the GUI screen 32 (step S37).

The consumable item user 1 mounts the polymer cartridge 512 that is a consumable item and a sample on the analyzer 3, and pushes an analysis start button for starting an analysis (step S38). The analysis takes approximately 30 minutes in case of a shortest analysis and takes approximately one week in case of a longest analysis. During such a time, the analyzer 3 performs an analysis. (step S39). When the analysis finishes (step S40), the analyzer 3 automatically transmits analysis information such as an analysis result and the number of times of injection to the consumable item supplier 2 via the network 7. The server 6 acquires these analysis information via the network 7 (step S41).

In the database 61 of the server 6, information is stored, the information relating to all consumable items that is supplied to the consumable item user 1 by the consumable item supplier 2. The server 6 can estimate an amount of consumable item 5 that the consumable item user 1 currently preserves by subtracting an amount of consumable item 5 that was used in the latest analysis that is notified newly by the analyzer 3 from consumable item information supplied to the consumable item user 1.

The server 6 transmits the remaining number information on the consumable items 5 to the analyzer 3 via the network 7 (step S42). Then, the analyzer 3 acquires information on the remaining number of the consumable items 5 from the server 6 via the network 7 (step S43).

In a case where an amount of the consumable items 5 is insufficient or it is anticipated that a shortage of the consumable items 5 will occur in near future, the analyzer 3 displays a message that prompts the consumable item user 1 to purchase the consumable items 5 that are expected to be in short on the GUI screen 32 (step S44). Upon receiving such a message, the consumable item user 1 purchases the consumable items 5 that are expected to be in short (step S45). The consumable item user 1 can order the consumable items 5 on the GUI screen 32 of the analyzer 3. With such an operation, the order information 4 is transmitted from the analyzer 3 to the server 6.

When the server 6 acquires the order information 4 of consumable items 5 (step S46), the processing returns to the step S20 in FIG. 3A.

Because of the message in step S44, the consumable item user 1 notices a shortage of the consumable items 5. Then, the analyzer 3, thereafter, immediately displays the screen on the GUI screen 32 where the consumable item user 1 orders the consumable items 5. As a result, the consumable item user 1 can smoothly order and acquire the consumable items 5. Then, the consumable item supplier 2 can smoothly supply the consumable items 5.

In the first embodiment, the preparation of an analysis is performed in such a manner that the consumable item user 1 himself/herself fills the polymer 91 that is a separation medium used in electrophoresis into the polymer cartridge 512. Whether the polymer cartridge 512 and the polymer 91 are proper is determined on the consumable item supplier 2 side by way of the network 7, and the consumable item supplier 2 notifies the determination result to the consumable item user 1. Accordingly, the cost performance of the consumable item user 1 relating to the polymer 91 can be enhanced and hence, it is possible to promote a consumable item supply activity.

Second Embodiment

Figure 4A:
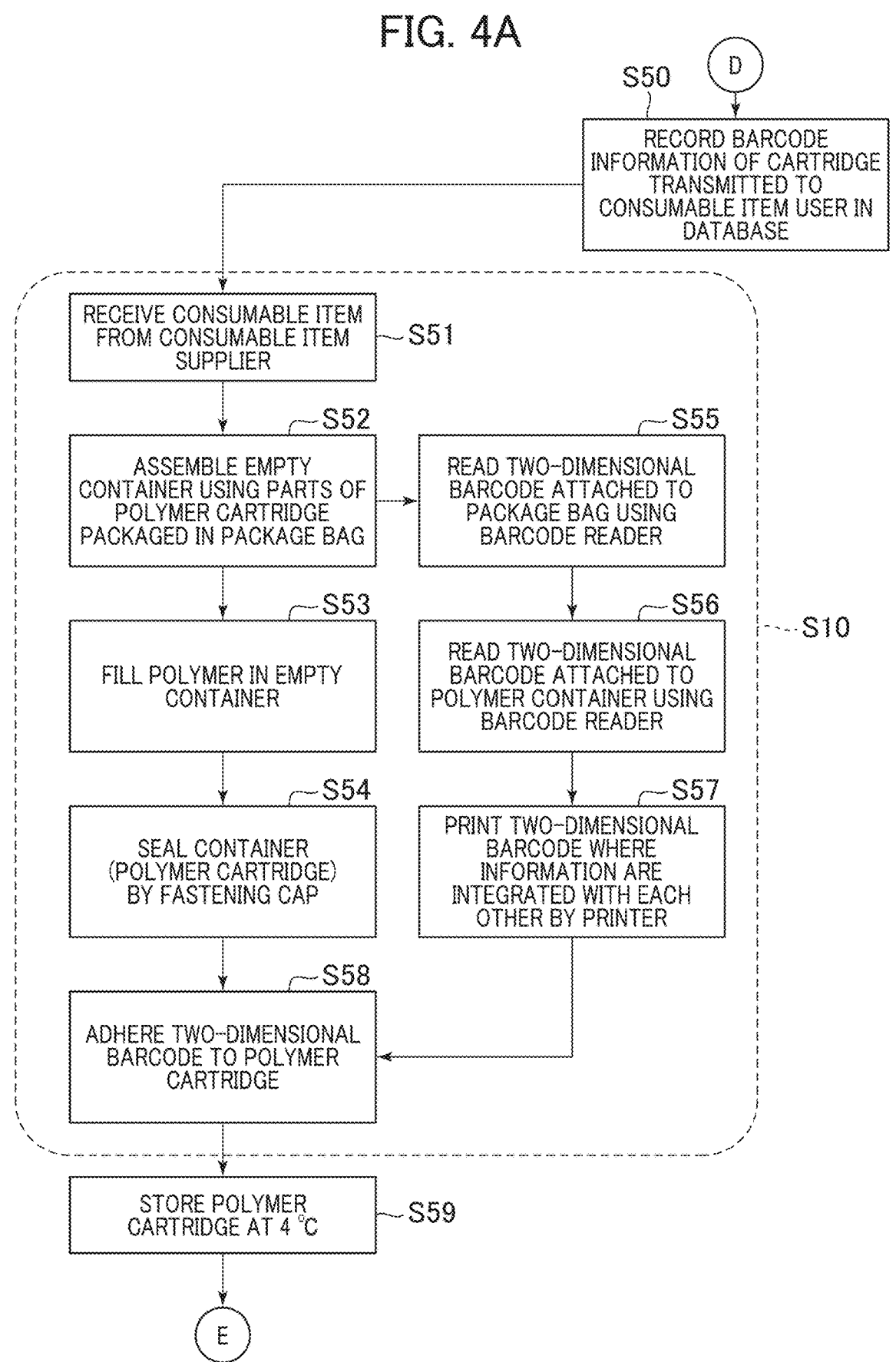
FIG. 4A is a flowchart of analysis preparation processing according to a second embodiment.
Figure 4B:
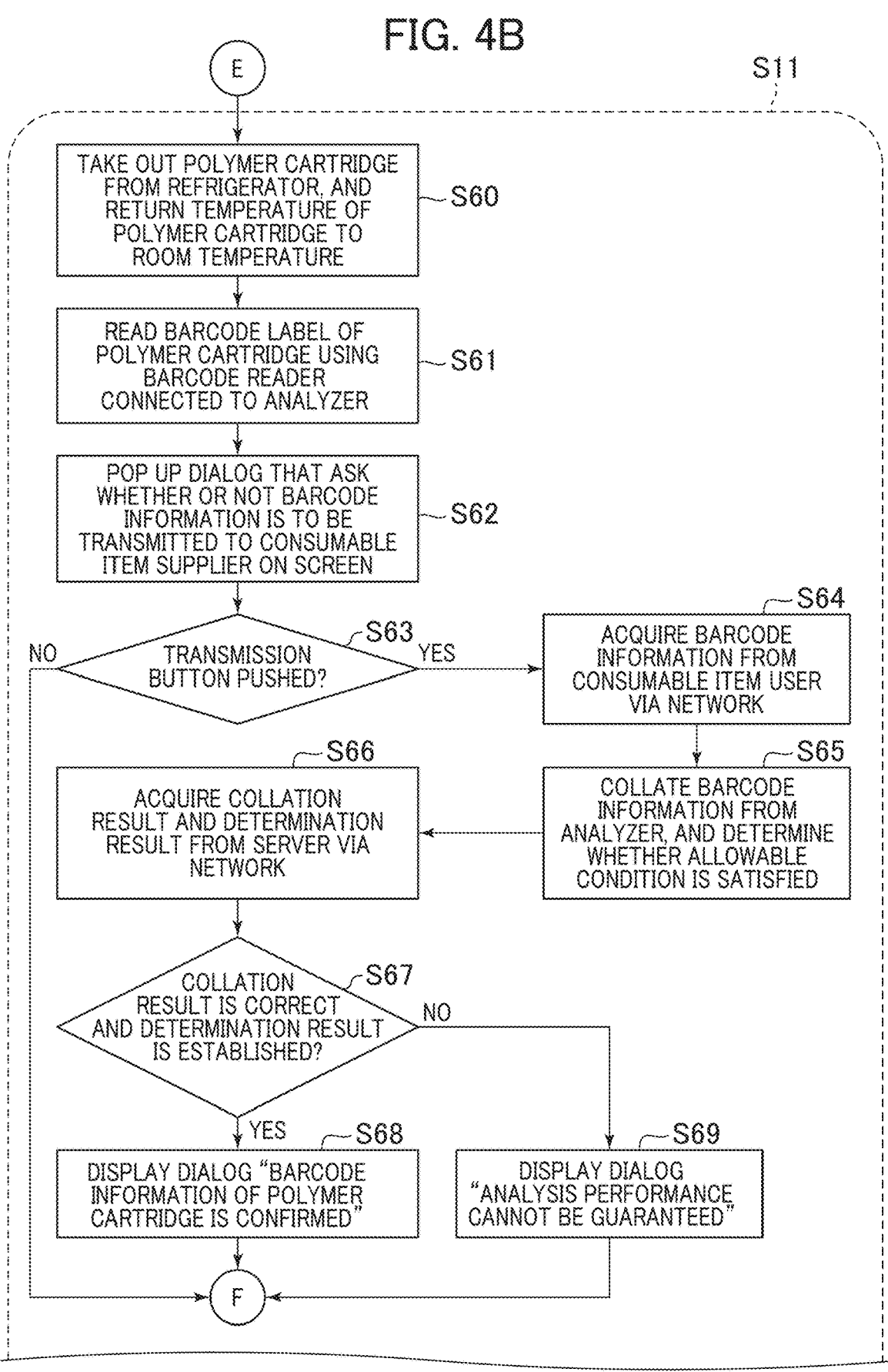
FIG. 4B is a flowchart of analysis preparation processing according to the second embodiment.

FIG. 4A to FIG. 4C illustrate a flowchart of analysis preparation processing according to the second embodiment. The flowchart of the second embodiment differs from the flowchart of the first embodiment with respect to a pint that, with respect to the transmitting of information via the Internet, the device confirms, each time, the consumable item user 1 whether or not the disclosure of information to the consumable item supplier 2 is favorable or not.

Processing from step S50 to step S60 in the second embodiment is substantially the same as step S20 to step S30 in the first embodiment.

In step S31 of the flowchart of the first embodiment, the consumable item user 1 reads the two-dimensional barcode label 521 of the polymer cartridge 512 by the barcode reader 31 connected to the analyzer 3. When this operation is completed, the analyzer 3 transmits the barcode information to the server 6. The server 6 acquires the barcode information on the polymer cartridge 512 that the consumable item user 1 is going to use, by the analyzer 3 via the network 7 (step S32).

To the contrary, in the flowchart of the second embodiment, in step S61, even if an operation of reading the two-dimensional barcode label 521 of the polymer cartridge 512 using the barcode reader 31 connected to the analyzer 3 is completed, the analyzer 3 does not transmit the barcode information to the server 6. The analyzer 3 pops up a dialogue that asks the consumable item user 1 whether or not the barcode information is to be transmitted to the consumable item supplier 2 (step S62), and determines whether or not a transmission button is pushed (step S63). Accordingly, the consumable item user 1 can decide whether or not the barcode information is to be disclosed to the consumable item supplier 2 by his/her own will.

When a transmission button on the screen of the analyzer 3 is pushed in step S63 (Yes), the analyzer 3 transmits barcode information to the server 6. The server 6 acquires barcode information from the analyzer 3 via the network 7 (step S64). When a cancel button or the like on the screen of the analyzer 3 is pushed in the step S63 (No), the processing advances to step S70 in FIG. 4C.

The processing from step S64 to S72 in the second embodiment is substantially equal to the processing from step S32 to step S39 in the first embodiment.

When the analysis is finished, in the step S40 of the flowchart in the first embodiment, the analyzer 3 transmits the analysis information such as the analysis result and the number of times of injection to the consumable item supplier 2 via the network 7. The server 6 acquires these analysis information via the network 7 (step S41).

On the other hand, even when the analysis is finished in the step S72 in the second embodiment, the analyzer 3 does not transmit the analysis information such as the analysis result and the number of times of injection to the consumable item supplier 2 via the network 7. The analyzer 3 pops up a dialog that asks the consumable item supplier 2 whether or not the analysis information is to be transmitted to the server 6 on the screen (step S73), and determines whether or not the transmission button is pushed (step S74). Accordingly, the consumable item user 1 can decide whether or not the analysis information is to be disclosed to the consumable item supplier 2 based on his/her own will.

When the transmission button on the screen of the analyzer 3 is pushed in step S74 (Yes), the analyzer 3 transmits the analysis information to the server 6. The server 6 acquires the analysis information from the analyzer 3 via the network 7 (step S75). When the cancel button on the screen of the analyzer 3 is pushed in step S74 (No), the processing advances ordering (purchasing) of the consumable items 5 in step S79. At this stage of processing, as a matter of fact, the consumable item user 1 can perform the selection of not performing ordering.

Hereinafter, processing from the step S76 to the step S78 in the second embodiment is substantially equal to the processing from the step S42 to the step S44 in the first embodiment.

Further, in the second embodiment, the barcode reader 31 is connected to the analyzer 3. However, the barcode reader 31 may be built in the analyzer 3.

Third Embodiment

Figure 5:
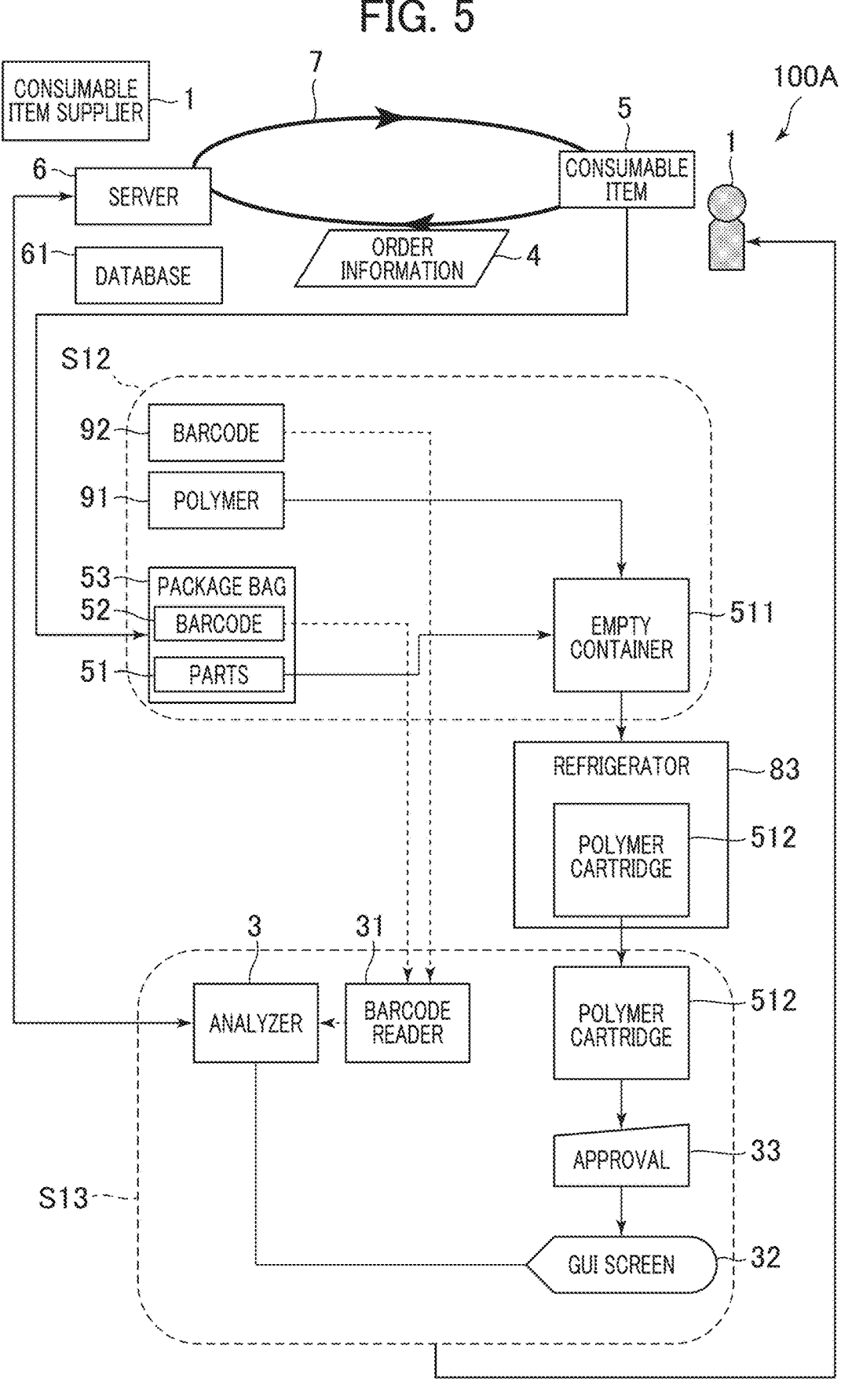
FIG. 5 is a view illustrating a configuration and an operation of an analysis system according to a third embodiment.

FIG. 5 is a view illustrating the configuration and the manner of operation of an analysis system 100A according to the third embodiment.

In FIG. 5, the third embodiment differs from the second embodiment described with reference to FIG. 2 with respect to a point that the barcode label that is formed by integrating information relating to the polymer 91 that is a reagent and the attribute information relating to the parts 51 of the polymer cartridge 512 is not prepared. That is, the analysis system 100A includes neither the barcode reader 81 nor the printer 82 compared to the analysis system 100 according to the second embodiment.

Further, in the preparation step S12 of the polymer cartridge 512 and the analysis step S13 performed using the analyzer 3, unlike the preparation step S10 and the analysis step S11 in the first embodiment, the two-dimensional barcode label 521 is not adhered to the polymer cartridge 512.

The two-dimensional barcode label 92 of the polymer 91 and the two-dimensional barcode label 52 attached to the package bag 53 that holds the parts 51 of the polymer cartridge 512 are read by the barcode reader 31 connected to the analyzer 3, and are directly recorded in the analyzer 3. In this processing, it is not always necessary that the barcode reader 31 is connected to the analyzer 3 by wiring, and it is sufficient that information can be transmitted to the analyzer 3 by any wireless communication method such as Wi-Fi (registered trademark). An advantageous effect of the analysis system 100A according to the third embodiment is that a printer that the consumable item user 1 uses for printing barcodes and a barcode reader that is operated by being connected with the printer become unnecessary.

Figure 6A:
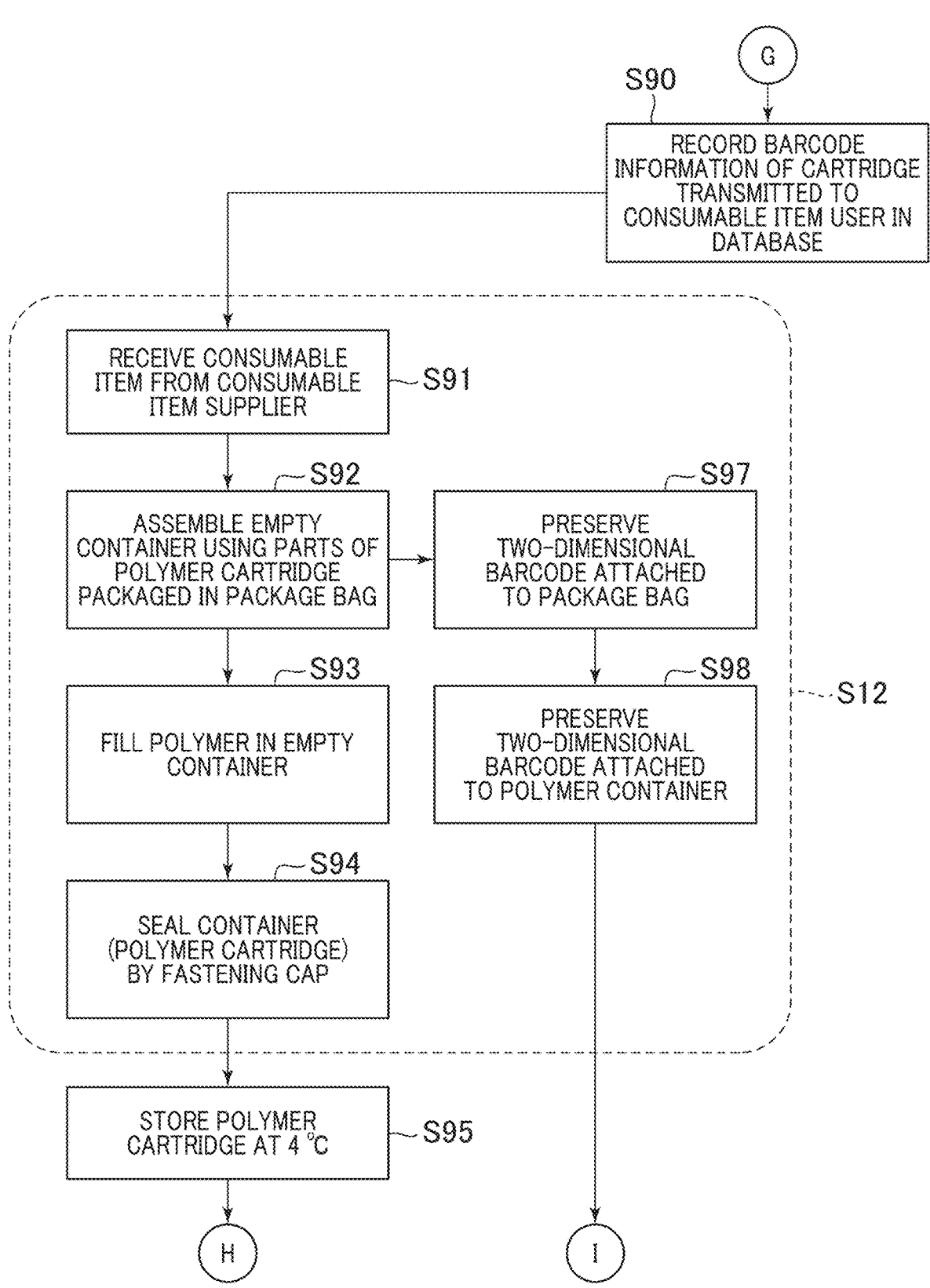
FIG. 6A is a flowchart of analysis preparation processing according to the third embodiment.
Figure 6B:
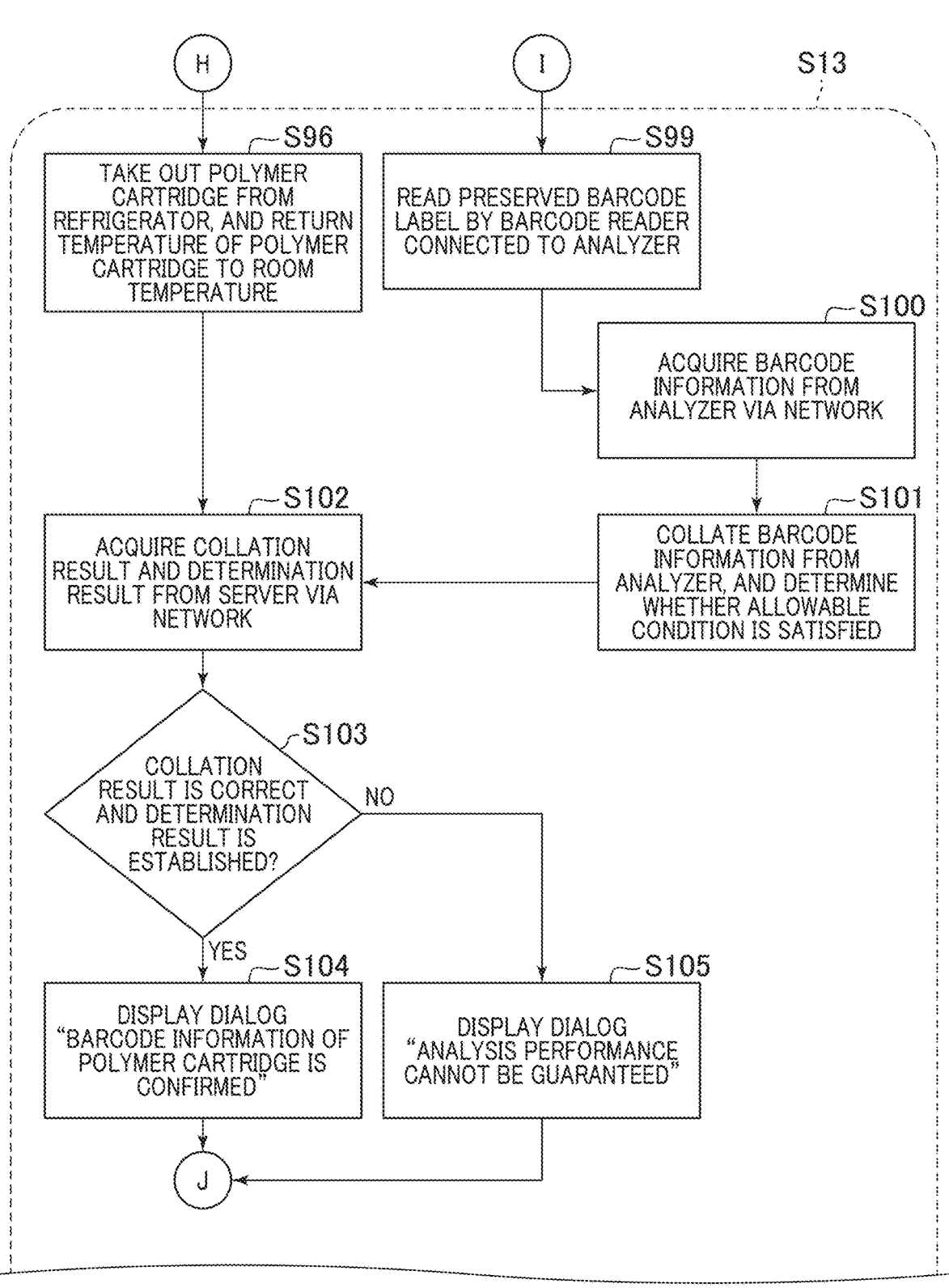
FIG. 6B is a flowchart of analysis preparation processing according to the third embodiment.
Figure 6C:
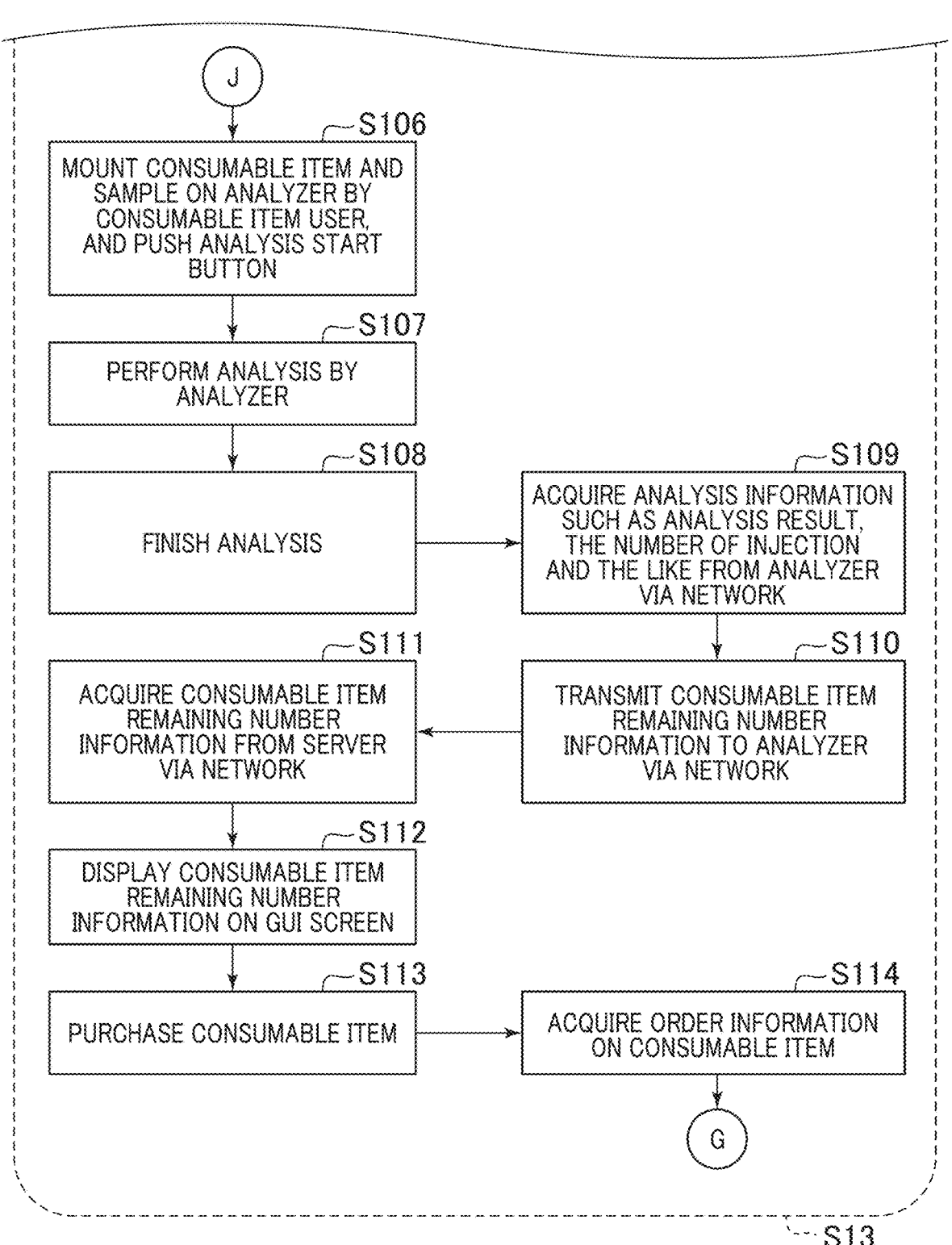
FIG. 6C is a flowchart of analysis preparation processing according to the third embodiment.

FIG. 6A to FIG. 6C illustrate a flowchart of analysis preparation processing according to the third embodiment.

The processing from the step S90 to the step S96 in the third embodiment are substantially equal to the processing from the step S20 to the step S26 in the first embodiment. The processing in the step S91 to the step S94, the step S97 and the step S98 is included in the preparation step S12. The processing in the step S96 and the processing from the step S99 to S114 are included in the analysis step S13.

In parallel with the operations from the step S92 to the step S96, the consumable item user 1 performs the operations from the step S97 to the step S101. The consumable item user 1 preserves the two-dimensional barcode label 52 attached to the package bag 53 for the parts 51 of the polymer cartridge 512 (step S97) and, further, preserves the two-dimensional barcode label 92 attached to the polymer container (step S98).

Then, in parallel with the use operation of the polymer cartridge 512 in the step S96, the consumable item user 1 reads the preserved two-dimensional barcode labels 52, 92 by the barcode reader 81 connected to the analyzer 3. This information is transmitted to the server 6 from the analyzer 3 via the network 7. That is, the server 6 acquires the barcode information of the polymer cartridge 512 that that consumable item user 1 is going to use via the network 7 (step S100). The analysis start date information is also included in the information.

The server 6 of the consumable item supplier 2 performs a collation operation between the attribute information relating to the parts 51 of the polymer cartridge 512 and the barcode information of consumable items 5 shipped to a market using the barcode information from the analyzer 3 (step S101). In the collation operation in the step S101, the server 6 collates whether or not the polymer cartridge 512 that corresponds to the barcode information is shipped as a genuine product. In a case where the polymer cartridge 512 is a product that is shipped as the genuine product, the server 6 determines that the collation result is correct.

In the step S101, the server 6 further determines whether or not the polymer cartridge 512 satisfies an allowable condition that can withstand an analysis based on information such as a manufacturer who manufactured the polymer 91 filled in the polymer cartridge 512, the rod number, the serial number, and the expiration date. To be more specific, the server 6 determines whether or not the polymer cartridge 512 can withstand the analysis by collating the analysis start date and the use expiration date information of the polymer 91.

Hereinafter, the processing from the step S102 to the step S114 in the third embodiment are substantially equal to the processing from the step S34 to the step S46 in the first embodiment.

Fourth Embodiment

Figure 7:
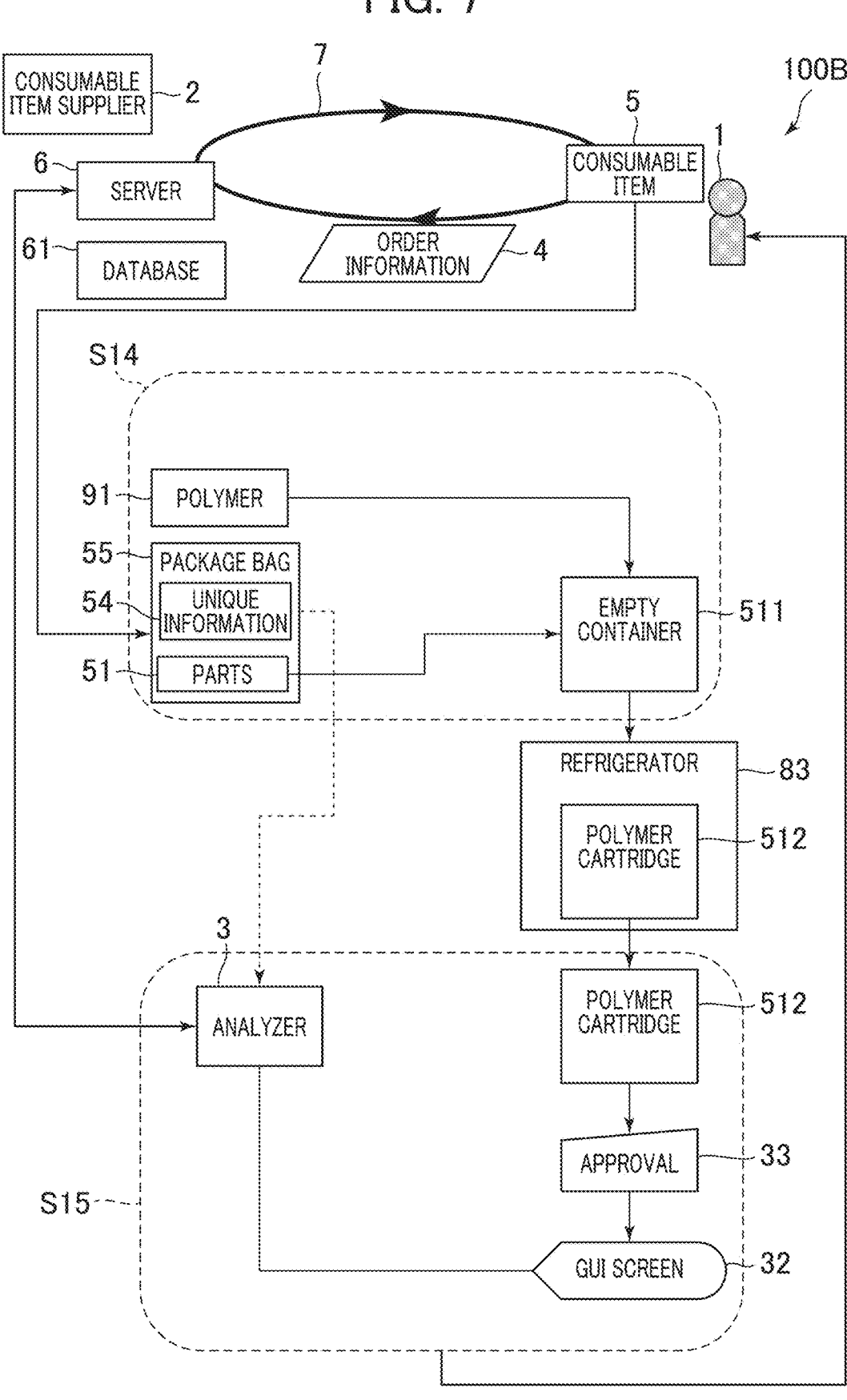
FIG. 7 is a view illustrating a configuration and an operation of an analysis system according to a fourth embodiment.

FIG. 7 is a view illustrating the configuration and the manner of operation of an analysis system 100B according to the fourth embodiment.

The analysis system 100B according to the fourth embodiment differs from the analysis system 100 according to the second embodiment described with reference to FIG. 2 with respect to a point that a barcode is not printed, and the information of the polymer 91 is not read by the analyzer 3. Due to such a difference, although the database 61 stores the attribute information of the consumable item 5 shipped to a market, the database 61 does not store the information on the polymer 91.

In the analysis system 100B according to the fourth embodiment, the consumable item supplier 2 transmits the attribute information of the parts 51 of the polymer cartridge 512 to the server 6 of the consumable item user 1. In this case, in using the consumable items 5 that the consumable item supplier 2 transmits, it is necessary for the consumable item user 1 to perform only inputting of the attribute information that the consumable item supplier 2 discloses into the analyzer 3.

Then, the server 6 acquires the attribute information of the polymer cartridge 512 transmitted from the analyzer 3, collates the acquired attribute information with the attribute information stored in the database 61, and determines whether or not the polymer cartridge 512 in which the polymer corresponding to the collated attribute information is already filled is proper as an object to be set on the analyzer 3.

Further, the preparation step S14 of the polymer cartridge 512 and the analysis step S15 performed using the analyzer 3 differ from the preparation step S10 and the analysis step S11 according to the first embodiment.

In this case, the information inputted to the analyzer 3 is not limited to the barcode information, and may be information that the consumable item supplier 2 offers to the consumable item user 1 in advance, to be more specific, the information may be information such as a password unique to the package bag 53 that that consumable item supplier 2 provides.

In the manual of the analyzer 3, there is a description that "must use a genuine consumable item (including polymer cartridge parrs for assembling the empty container of the polymer cartridge) that the consumable item supplier provides". In a case where the consumable item user 1 uses a consumable item that a third vender supplies, there is a possibility that a drawback arises. The analysis system 100B according to the fourth embodiment warns the possibility of the occurrence of such a drawback, and attracts an attention of the consumable item user 1.

Further, in the same manner, also with respect to the polymer used in the analysis, a kind of polymer to be used in the analysis is explicitly described in the manual. Accordingly, even in a case where any drawback arises as a result of the use of other polymer by the consumable item user 1 in the analysis, it is unnecessary for the consumable item supplier 2 to owe the responsibility.

Figure 8A:
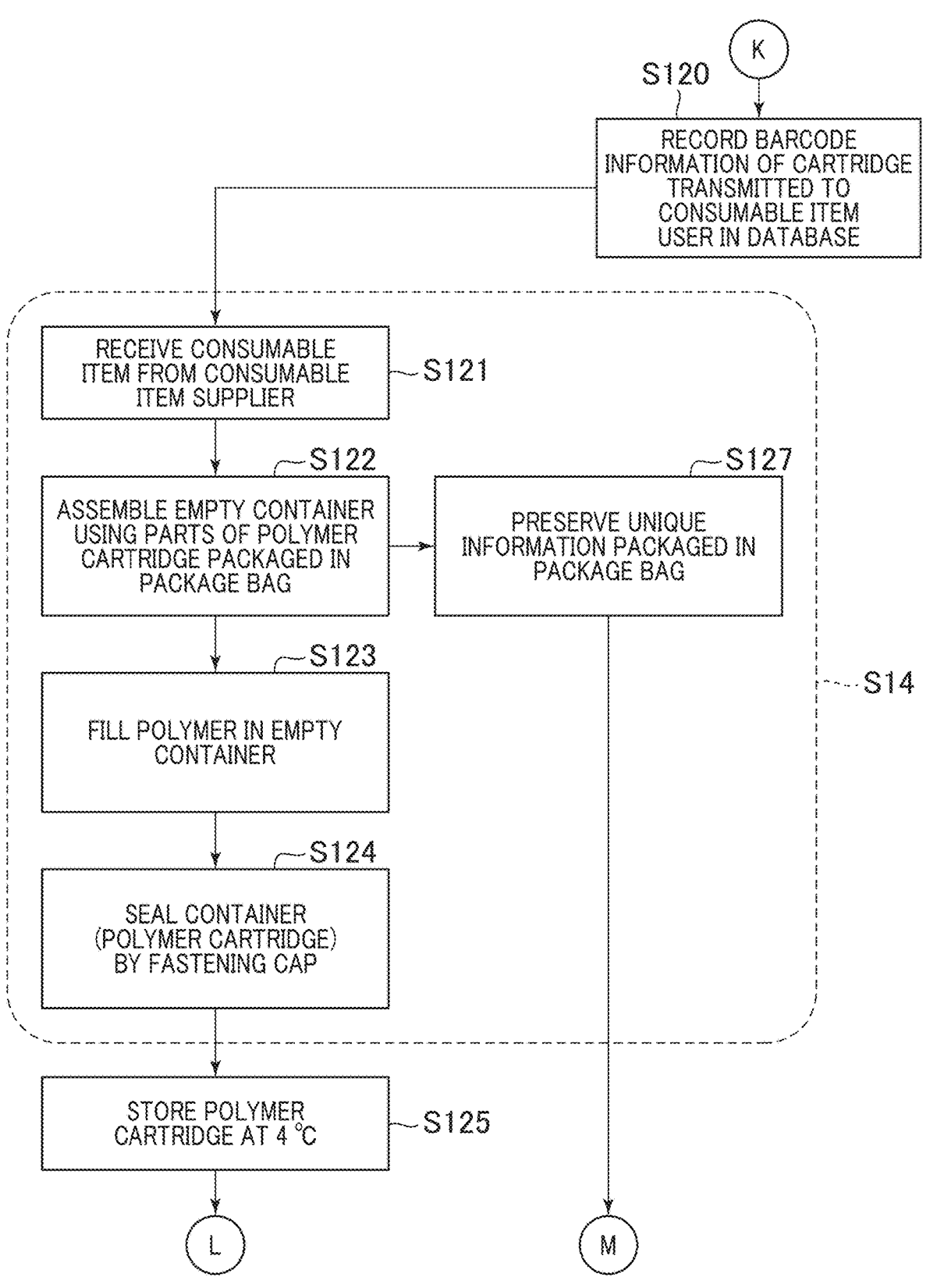
FIG. 8A is a flowchart of analysis preparation processing according to the fourth embodiment.
Figure 8B:
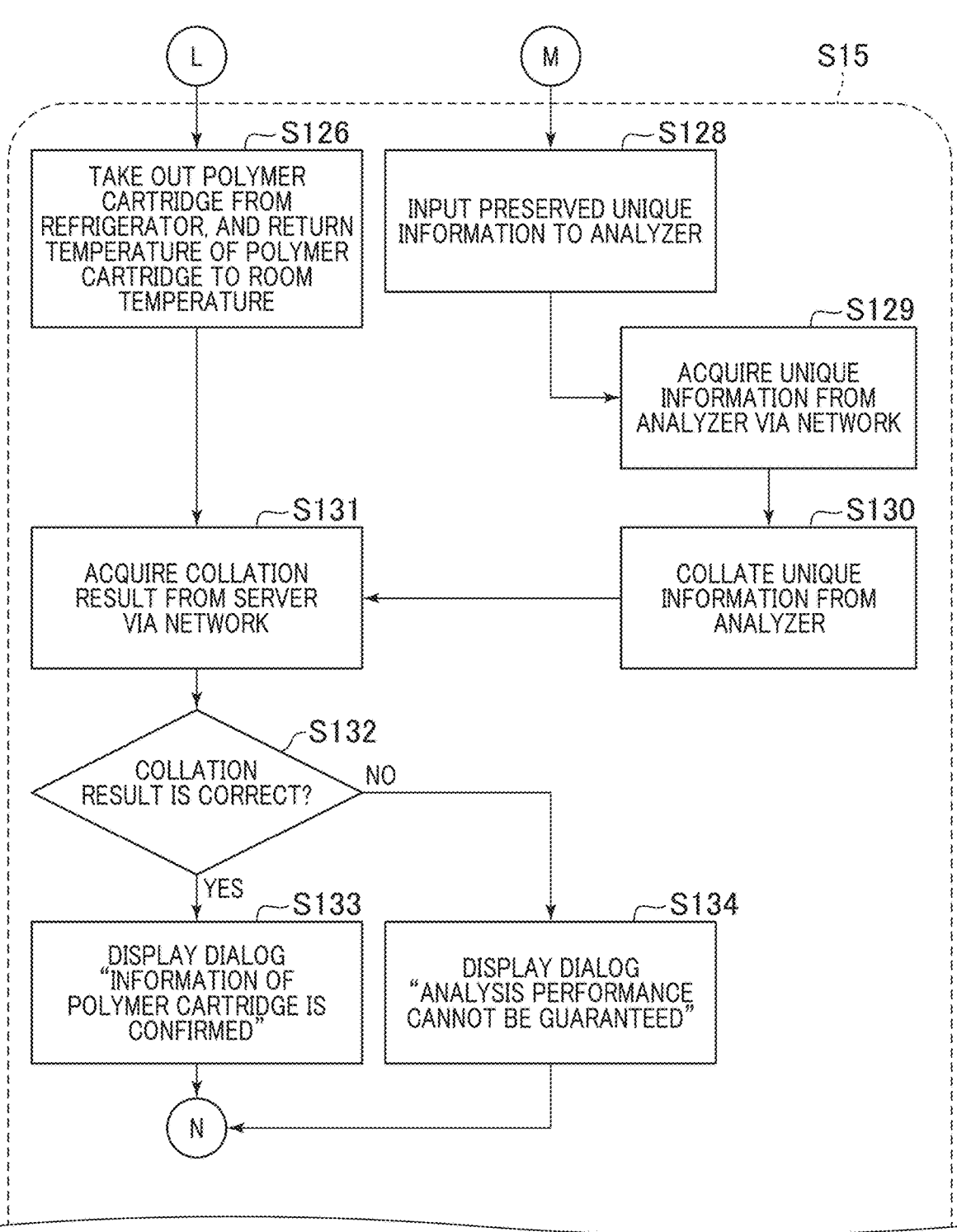
FIG. 8B is a flowchart of analysis preparation processing according to the fourth embodiment.
Figure 8C:
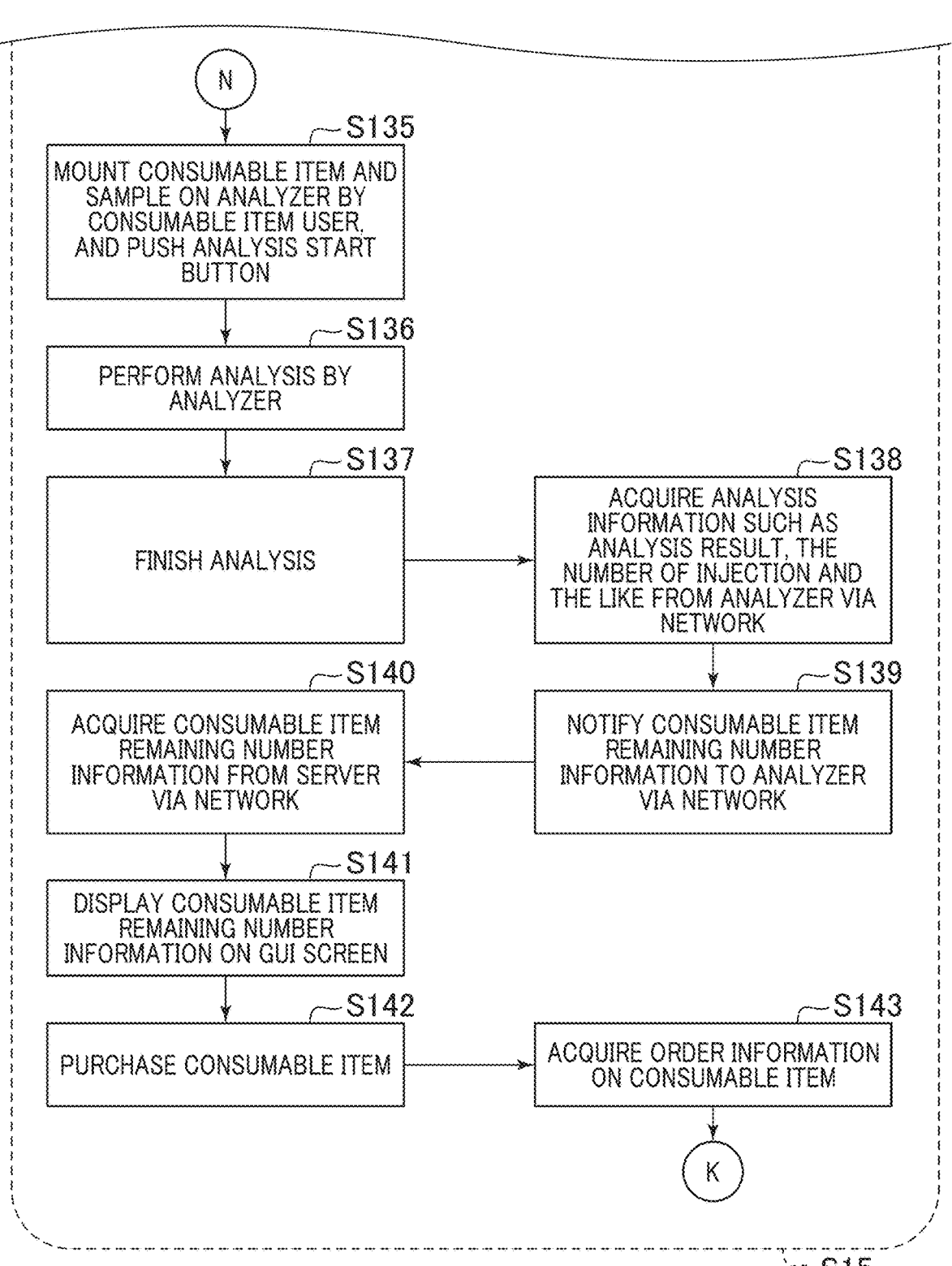
FIG. 8C is a flowchart of analysis preparation processing according to the fourth embodiment.

FIG. 8A to FIG. 8C illustrate a flowchart of analysis preparation processing according to the fourth embodiment.

The processing from the step S120 to the step S126 according to the fourth embodiment are substantially equal to processing step S20 to the step S26 according to the first embodiment. Processing from the step S121 to the step S124 and the processing in the step S127 are included in the preparation step S14. The processing in the step S126 and the processing from the step S128 to the step S143 are included in the analysis step S15.

In parallel to the operations from the step S122 to the step S126, the consumable item user 1 preforms the operations from the step S27 to the step S130. The consumable item user 1 preserves unique information 54 packaged in the package bag 53 of the parts 51 of the polymer cartridge 512 (step S127). This unique information 54 is constituted of various information respectively relating to ten polymer cartridges 512 of the parts 51 such as parts numbers of the parts 51 of the polymer cartridge 512.

Then, in parallel with the use operation of the polymer cartridge 512 in the step S126, the consumable item user 1 inputs the preserved unique information 54 to the analyzer 3 (step S128). This information is transmitted from the analyzer 3 to the server 6 via the network 7. That is, the server 6 acquires the unique information 54 of the polymer cartridge 512 that the consumable item user 1 is going to use via the network 7 (step S129). The analysis start date information is also included in the information.

The server 6 of the consumable item supplier 2 performs a collation operation between the attribute information relating to the parts 51 of the polymer cartridge 512 and the unique information 54 of the consumable items 5 shipped to a market by the consumable item supplier 2 based on the unique information 54 from the analyzer 3 (step S130). In this collation operation, the server 6 collates whether or not the polymer cartridge 512 corresponding to the unique information 54 is genuinely shipped product, and such a polymer cartridge 512 is not reused. In a case where the polymer cartridge 512 is a genuinely shipped product and is not reused, the server 6 determines that the collation result is correct.

The analyzer 3 acquires the collation result from the server 6 via the network 7 (step S131). Then, the analyzer 3 determines whether or not the collation result of the unique information 54 is correct (step S132).

In the step S132, in a case where the collation result of the unique information 54 is correct (Yes), the analyzer 3 displays a dialog "the information of the polymer cartridge is confirmed" on the GUI screen 32 (step S133).

In the step S132, in a case where the collation result of the unique information 54 is incorrect (No), the analyzer 3 displays a dialog "the analysis performance cannot be guaranteed" on the GUI screen 32 (step S134).

The consumable item user 1 mounts the polymer cartridge 512 that is a consumable item and the sample on the analyzer 3, and pushes the analysis start button for starting the analysis (step S135).

Hereinafter, the processing from the step S135 to the step S143 are substantially equal to the step S38 to the step S46 in the first embodiment. Accordingly, the consumable item user 1 can perform smooth ordering and acquisition of the consumable items 5. Then, the consumable item supplier 2 can smoothly provide the consumable items 5.

(Modifications)

It should be noted that the present invention is not limited to the embodiments described above, and includes various modification examples. For example, the embodiments described above have been described in detail to simply describe the present invention, and are not necessarily required to include all the described configurations. In addition, part of the configuration of one embodiment can be replaced with the configurations of other embodiments, and in addition, the configuration of the one embodiment can also be added with the configurations of other embodiments. In addition, part of the configuration of each of the embodiments can be subjected to addition, deletion, and replacement with respect to other configurations.

The respective configurations, the respective functions, the respective processing units, the respective processing means and the like described above may be partially or wholly realized by a hardware such as an integrated circuit, for example. The respective configurations, the respective functions and the like described above may be realized by software by allowing a processor to interpret and execute programs for realizing the respective functions. The information on programs, tables, files and the like for realizing the respective functions may be stored in a recording device such as a memory, a hard disk, a solid state drive (SSD), or a recording medium such as a flash memory card and digital versatile disk (DVD).

In the respective embodiments, with respect to control lines and information lines, those lines that are considered necessary for the description of the present invention are indicated. It is not always the case that all control lines and information lines that are necessary in terms of the product are described. In an actual system, it is safe to say that almost all configurations are mutually connected to each other.

As modifications of the present inventions, for example, the following modifications (a) to (d) are considered.

(a) The present invention is not limited to the case where the polymer is used as a reagent, and any arbitrary reagent may be used.

(b) The barcode reader 31 according to present invention is not limited to a barcode reader that is connected to the analyzer 3, and may be a transmission device that independently transmits information to the server 6 via the network 7, for example.

(c) The barcode reader 81 and the barcode reader 31 according to the first embodiment may be the same barcode reader.

(d) A wireless tag may be attached to the package bag 53 of consumable items 5 in place of the two-dimensional barcode label. Further, the analysis system 100 may include a wireless tag reader in place of the barcode reader, and may include a wireless tag writer in place of the printer.

REFERENCE SIGNS LIST

100: analysis system
1: consumable item user
2: consumable item supplier
3: analyzer
31: barcode reader
32: GUI screen
4: order information
5: consumable item
51: parts
511: empty container
512: polymer cartridge (reagent filling container)
52: two-dimensional barcode label
521: two-dimensional barcode label
53: package bag
54: unique information
6: server
61: database
7: network
81: barcode reader
82: printer
83: refrigerator
91: polymer (reagent)
92: two-dimensional barcode label

The invention claimed is:

1. An analysis system comprising:
a server coupled to a network;
an analyzer, communicably connected to the network, being an electrophoresis device that performs electrophoresis of a sample using a first reagent filling container, among a plurality of reagent filling containers, and a reagent, among a plurality of reagents;
a barcode reader, communicably connected to the server, that is configured to: acquire attribute information that includes lot information of the first reagent filling container, information relating to the reagent, and information indicating an analysis start date, and transmit the attribute information of the first reagent filling container, the information relating to the reagent, and the information indicating the analysis start date to the server; and
a display coupled to the analyzer; and
a database, connected to the server, that stores attribute information that includes lot information of reagent filling containers, among the plurality of reagent filling containers and information relating to reagents, among the plurality of reagents,
wherein the server is configured to:
acquire the attribute information of the first reagent filling container, the information relating to the reagent, and the information indicating the analysis start date transmitted from the barcode reader,
compare, as a first comparison, the attribute information of the first reagent filling container and the information relating to the reagent transmitted from the barcode reader with the attribute information of the reagent filling containers and the information relating to the reagents stored in the database, and compare, as a second comparison, the information relating to the reagents with the information indicating the analysis start time,
determine, based on the first comparison and the second comparison, whether a reagent filling container filled with a reagent is suitable as an object to be sent to the analyzer, as a determination result, and
transmit the determination result to the analyzer,
wherein the analyzer is configured to acquire the determination result from the server, and display the determination result.

2. The analysis system according to claim 1, wherein the server transmits a remaining number of information of consumable items to the analyzer.

3. The analysis system according to claim 1 further comprising:
a first reader that reads information relating to a reagent, among the plurality of reagents, and reads attribute information on a reagent filling container, among the reagent filling container; and
a second reader being the barcode reader that is configured to read a data label in which integrated information obtained by integrating the information relating to the reagent and the attribute information on the reagent filling container that are read by the first reader are encoded,
wherein the server is configured to:
acquire the information relating to the reagent and the attribute information on the reagent filling container that are transmitted from the second reader,
compare the information and the attribute information with information and attribute information stored in the database,
determine whether the reagent filling container in which a reagent has been already filled that corresponds to the compared information and attribute information is suitable as an object to be sent to the analyzer, and
transmit a determination result to the analyzer.

4. The analysis system according to claim 3, wherein the first reader and the second reader are the same reader.

5. The analysis system according to claim 4, wherein the same reader is connectable to the analyzer.

6. The analysis system according to claim 4, wherein the same reader is a part of the analyzer.

7. The analysis system according to claim 1, wherein the reagent is polymer.

8. An analysis method comprising the steps of:
acquiring, by a barcode reader that is a part of an analyzer that includes a display, attribute information that includes lot information of the first reagent filling container, information relating to the reagent, and information indicating an analysis start date, and transmit the attribute information of the first reagent filling container, the information relating to the reagent, and the information indicating the analysis start date to a server;
acquiring, by the server, the attribute information of the first reagent filling container, the information relating to the reagent, and the information indicating the analysis start date transmitted from the barcode reader;
comparing, by the server, as a first comparison, the attribute information of the first reagent filling container and the information relating to the reagent transmitted from the barcode reader with the attribute information of the reagent filling containers and the information relating to the reagents stored in the database, and compare, as a second comparison, the information relating to the reagents with the information indicating the analysis start time;

determining, by the server, based on the first comparison and the second comparison, whether a reagent filling container filled with a reagent is suitable as an object to be sent to the analyzer, as a determination result;

transmitting, by the server, the determination result to the analyzer; and acquiring, by the analyzer, the determination result from the server and displaying, by the analyzer, the determination result on the display.

* * * * *